United States Patent
Lee et al.

(10) Patent No.: US 10,884,536 B2
(45) Date of Patent: Jan. 5, 2021

(54) MOBILE TERMINAL AND CONTROL METHOD THEREOF

(71) Applicant: LG ELECTRONICS INC., Seoul (KR)

(72) Inventors: Joowoo Lee, Seoul (KR); Minsoo Byun, Seoul (KR); Jie Seol, Seoul (KR); Soomin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/093,598

(22) PCT Filed: May 24, 2016

(86) PCT No.: PCT/KR2016/005485
§ 371 (c)(1),
(2) Date: Oct. 12, 2018

(87) PCT Pub. No.: WO2017/183764
PCT Pub. Date: Oct. 26, 2017

(65) Prior Publication Data
US 2019/0121482 A1   Apr. 25, 2019

(30) Foreign Application Priority Data
Apr. 18, 2016   (KR) .................. 10-2016-0047192

(51) Int. Cl.
*G06F 3/041*    (2006.01)
*G06F 3/0488*   (2013.01)
(Continued)

(52) U.S. Cl.
CPC .......... *G06F 3/0414* (2013.01); *G06F 1/3265* (2013.01); *G06F 3/0488* (2013.01);
(Continued)

(58) Field of Classification Search
CPC .. G06F 1/3265; G06F 3/0414; G06F 3/04817; G06F 3/0488; H04M 1/725;
(Continued)

(56) References Cited

U.S. PATENT DOCUMENTS 9,778,780 B2 * 10/2017 Kim .................... G06F 3/04845
2007/0252821 A1 * 11/2007 Hollemans ............ G06F 3/0488
345/173

(Continued)

FOREIGN PATENT DOCUMENTS

KR       101412448      6/2014
KR      20140094384     7/2014
(Continued)

OTHER PUBLICATIONS

PCT International Application No. PCT/KR2016/005485, International Search Report dated Jan. 9, 2017, 2 pages.

*Primary Examiner* — Afroza Chowdhury
(74) *Attorney, Agent, or Firm* — Lee, Hong, Degerman, Kang & Waimey

(57) ABSTRACT

The mobile terminal according to one embodiment of the present invention comprises: a touch screen formed to be capable of shifting from any one of an active state and an inactive state to the other one, and to have predetermined information outputted when shifted from the active state to the inactive state; and a control unit which, on the basis of the touch level of a touch input applied to the touch screen in the active state during a first work state of a first application, changes the first work state to a second work state related to the first work state. Further, when a subsequent touch input exceeding a reference pressure is applied to the touch screen during the second work state, the control (Continued)

unit can perform control such that the first or second work state continues to be run on the touch screen in the inactive state.

19 Claims, 32 Drawing Sheets

(51) Int. Cl.
  *H04M 1/725* (2006.01)
  *G06F 1/3234* (2019.01)
  *G06F 3/0481* (2013.01)

(52) U.S. Cl.
  CPC .... *G06F 3/04817* (2013.01); *H04M 1/72519* (2013.01); *H04M 2201/34* (2013.01); *H04M 2250/22* (2013.01)

(58) Field of Classification Search
  CPC ......... H04M 1/72519; H04M 2201/34; H04M 2250/22
  See application file for complete search history.

(56) References Cited

U.S. PATENT DOCUMENTS

| | | | |
|---|---|---|---|
| 2011/0063248 A1* | 3/2011 | Yoon | G06F 3/0485 345/174 |
| 2012/0306766 A1 | 12/2012 | Moore | |
| 2013/0141371 A1* | 6/2013 | Hallford | G06F 3/0488 345/173 |
| 2014/0111456 A1* | 4/2014 | Kashiwa | G06F 3/04883 345/173 |
| 2014/0300569 A1* | 10/2014 | Matsuki | G06F 3/0488 345/173 |
| 2014/0375596 A1* | 12/2014 | Kim | G06F 3/0416 345/174 |
| 2016/0162098 A1* | 6/2016 | Kim | G06F 3/048 345/174 |
| 2016/0284049 A1* | 9/2016 | Chi | G06F 1/1652 |
| 2017/0357362 A1* | 12/2017 | Shim | G06F 1/169 |

FOREIGN PATENT DOCUMENTS

| | | |
|---|---|---|
| KR | 20150081692 | 7/2015 |
| KR | 20150117120 | 10/2015 |

* cited by examiner

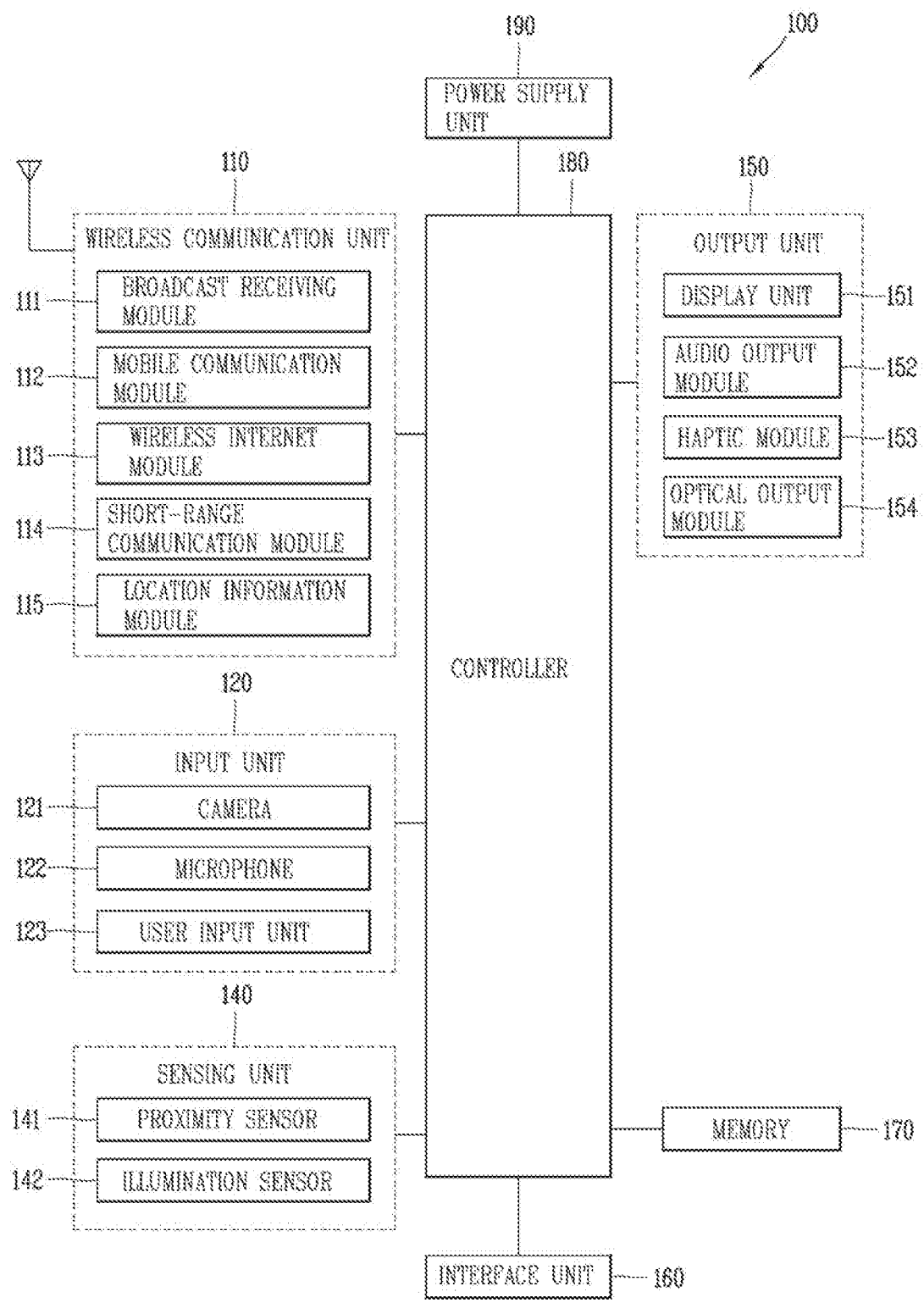

FIG. 16B
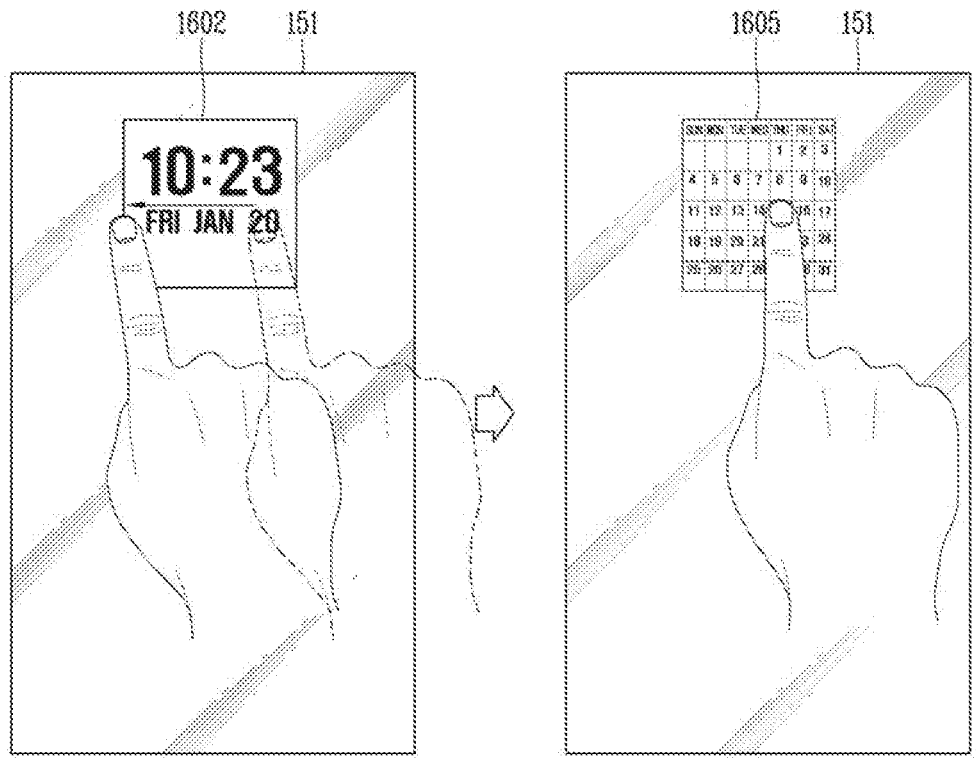
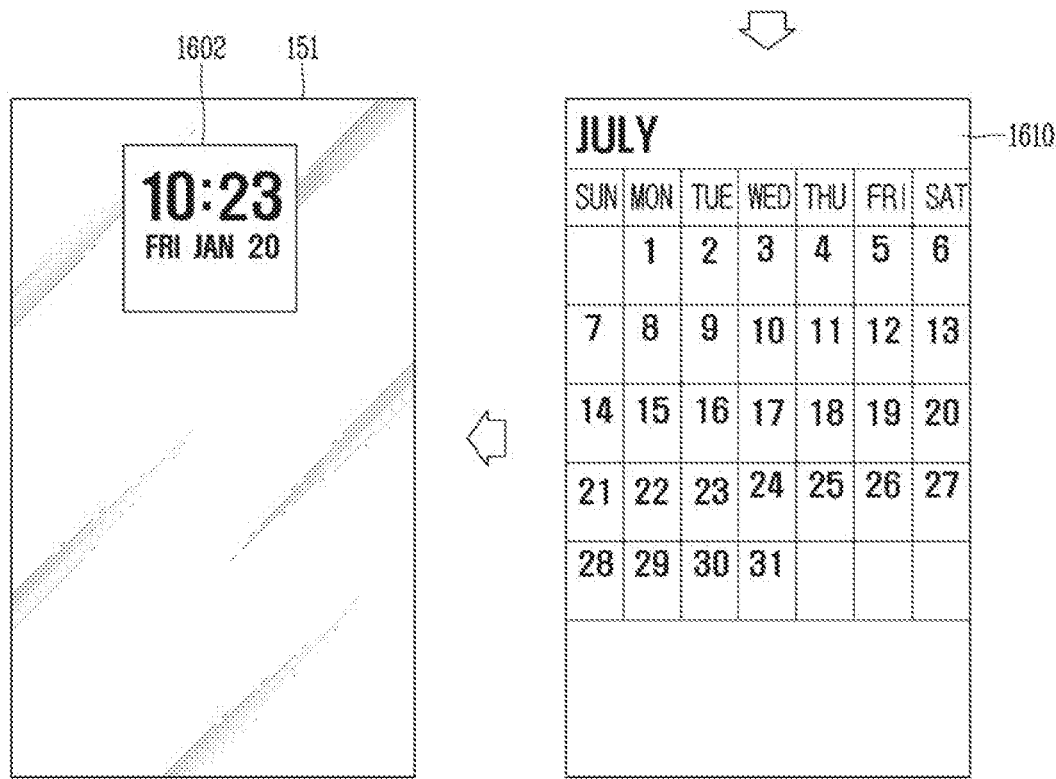

FIG. 19B
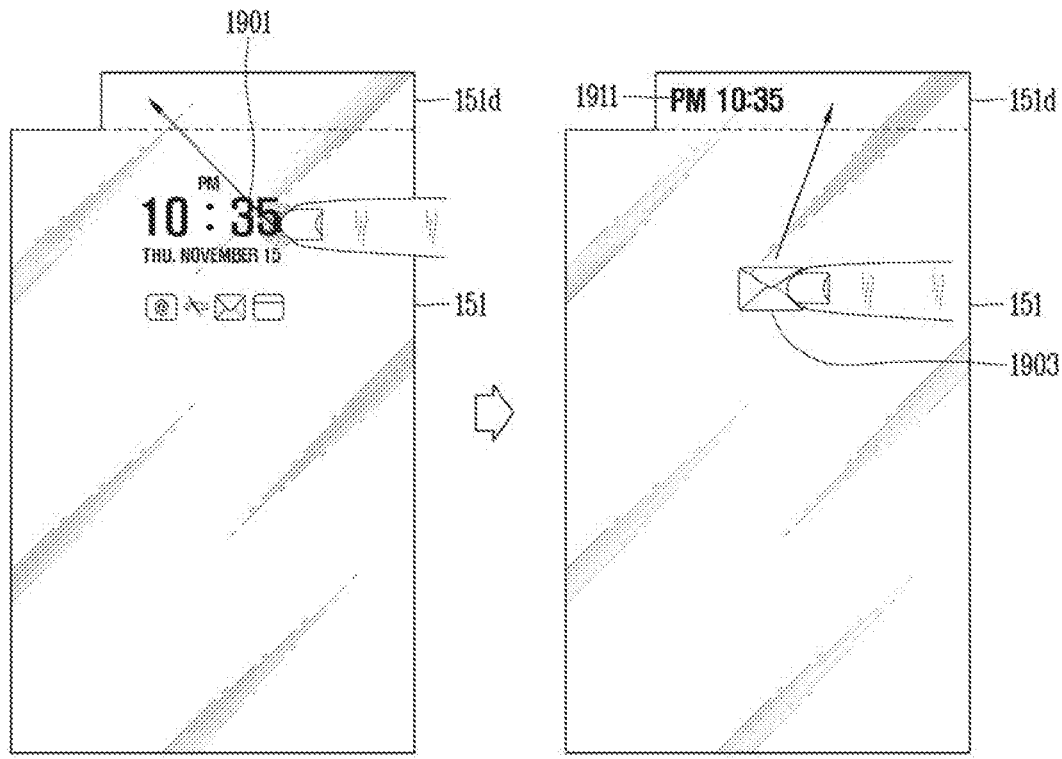
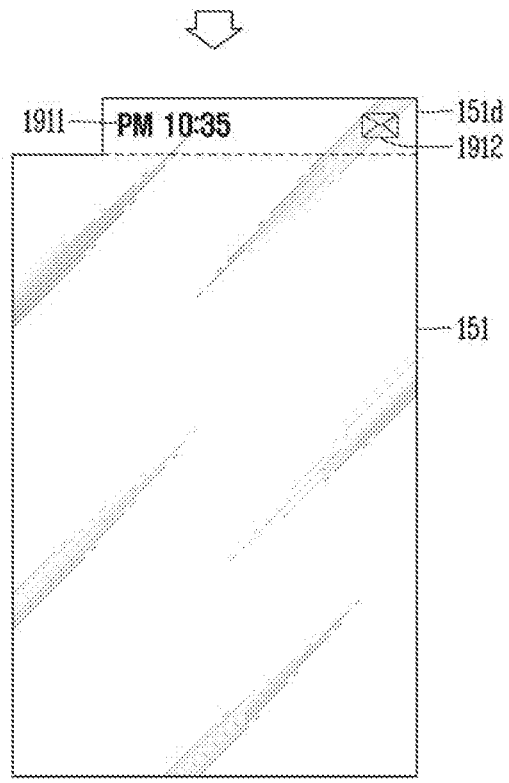

FIG. 21B
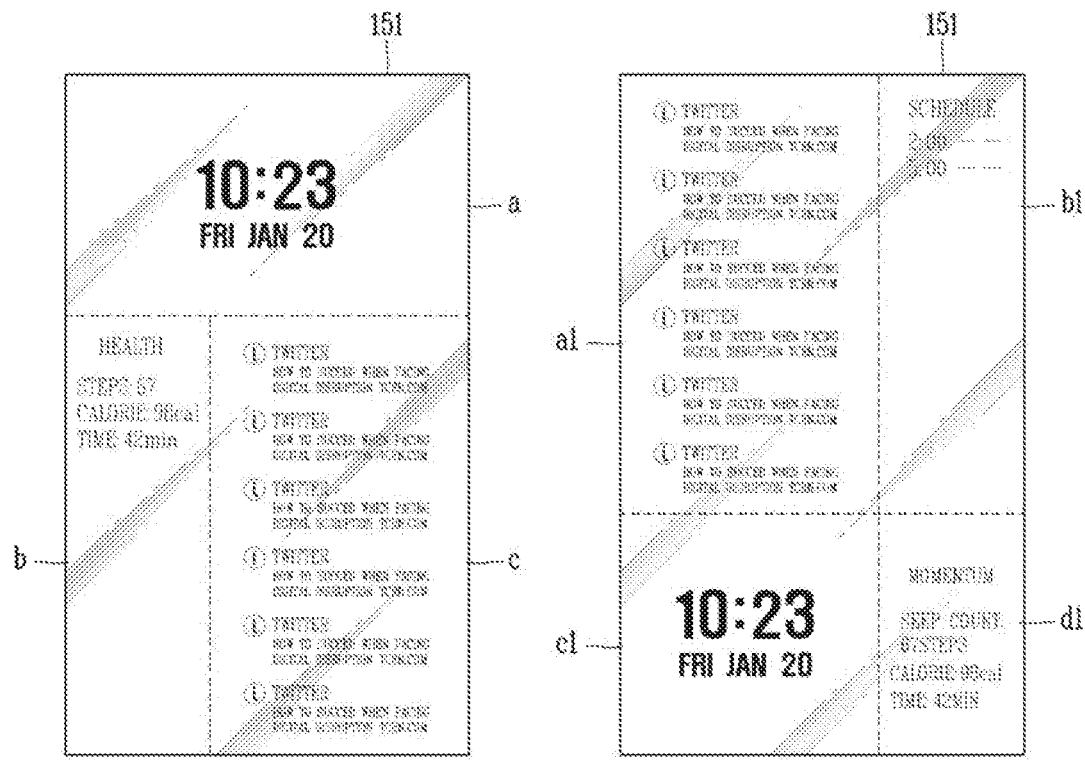
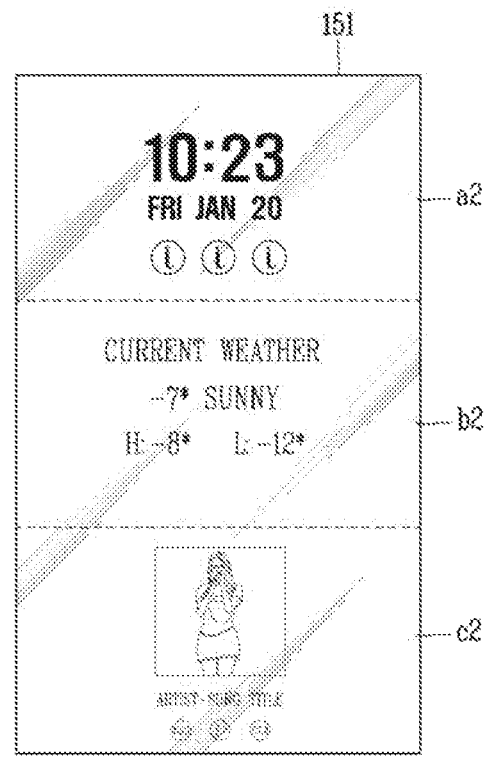

MOBILE TERMINAL AND CONTROL METHOD THEREOF

CROSS-REFERENCE TO RELATED APPLICATIONS

This application is the National Stage filing under 35 U.S.C. 371 of International Application No. PCT/KR2016/005485, filed on May 24, 2016, which claims the benefit of earlier filing date and right of priority to Korean Application No. 10-2016-0047192, filed on Apr. 18, 2016, the contents of which are all hereby incorporated by reference herein in their entirety.

FIELD

The present invention relates to a mobile terminal having a touch screen, and a method of controlling the same.

BACKGROUND

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

The mobile terminal may also execute a plurality of applications based on a user input. In this case, execution screens of the plurality of applications are generated in a plurality of layers. At this time, only an execution screen existing in the uppermost layer is usually displayed on the display of the mobile terminal.

The mobile terminal may switch (move or shift) the plurality of layered execution screens based on a touch input. At this time, regardless of an attribute of a currently displayed execution screen, switching (or changing) to a previously stopped task state or a previously output display state is carried out. Thus, additional interactions are often required even after switching the execution screen.

In addition, it is necessary to monitor a current task state for a long time without additional interaction of the user, or to immediately check information even if the user does not continuously monitor it. For this purpose, a function of preventing the display from being turned off while the user is watching the display is applied, but there is a problem that a battery is consumed by turning on the display for a long time.

DETAILED DESCRIPTION OF THE DISCLOSURE

Therefore, one aspect of the present invention is to provide a mobile terminal, capable of switching (shifting, moving, changing) to an execution screen related to a current task state while moving (shifting) among a plurality of applications, and a control method thereof.

Another aspect of the present invention is to provide a mobile terminal, capable of displaying a current task state or an execution screen itself related to the current task state while reducing a battery consumption, and a control method thereof.

A mobile terminal according to an embodiment of the present invention may include a display unit (or a touch screen) formed to be switchable (or changeable) from one of an active state and an inactive state to another, and output predetermined information when being switched from the active state to the inactive state, and a controller to switch a first task state of a first application to a second task state associated with the first task state, based on a touch degree of a touch input applied to the display unit in the first task state. In addition, the controller may control one of the first and second task states to be continuously executed in the inactive state when a touch input exceeding a reference pressure is subsequently applied to the display unit in the second task state.

In one embodiment, the controller may display information corresponding to one of the first and second task states executed in the inactive state in a predetermined area of the display unit, and the information and the task state corresponding to the information may be maintained even after the touch input exceeding the reference pressure is released.

In one embodiment, the controller may display guide information on the display unit to guide an input for executing the second task state in the inactive state, when the first task state is switched to the second task state.

In one embodiment, the controller may switch the active state to the inactive state at a time point when the touch input exceeding the reference pressure applied in the second task state is released.

In one embodiment, the second task state may be determined according to a touch degree of the touch input applied in the first task state and information output at a touch point of the touch input.

In one embodiment, the controller may execute a second application associated with the information output at the touch point of the touch input applied in the first task state, and execute a second task state corresponding to a setting mode of the second application associated with the first task state.

In one embodiment, the controller may set at least one setting information to be displayed in the inactive state when the at least one setting information is input in the second task state using the touch input exceeding the reference pressure in the setting mode.

In one embodiment, the controller may pop up a sub menu associated with the second task state on the display unit when the touch input exceeding the reference pressure, applied in the second task state, is dragged in a preset direction, and selectively execute a function associated with the popped-up sub menu according to a dragged degree of the touch input.

In one embodiment, the controller may select at least some of displayed objects based on a touch degree of a touch input applied to a first screen corresponding to the first task state, and execute a second task state in which the selected object is input in an execution screen of the second application associated with the first task state when the touch input exceeding the reference pressure is subsequently applied to the selected object.

In one embodiment, the controller may switch the active state to the inactive state and display the selected object together with the predetermined information when the touch input exceeding the reference pressure is continuously applied to the display unit in the state where the execution screen of the second application is displayed.

In one embodiment, while one of the first and second task states is executed in the inactive state, the controller may change at least one of a position and a size of a screen area, which corresponds to the task state being executed, in the inactive state based on a touch input applied to the screen area.

In one embodiment, while one of the first and second task states is executed in the inactive state, when the touch input exceeding the reference pressure is applied to a screen area, which corresponds to the task state being executed, the controller may switch the inactive state to the active state and display information output on a screen area on the entire display unit.

In one embodiment, when a drag touch input is applied to the display unit in a preset direction while one of the first and second task states is executed in the inactive state, the controller may switch a third screen corresponding to the task state being executed to the predetermined information or a fourth screen different from the third screen, based on the dragged direction.

In one embodiment, when the touch input exceeding the reference pressure is applied to the display unit while one of the predetermined information and the fourth screen is displayed in the inactive state, the controller may display a hole area around a touch point of the touch input and control an image which was displayed in the active state of the display unit to be displayed in the hole area.

In one embodiment, when an event occurs in at least one application while one of the first and second task states is executed in the inactive state, the controller may display a notification icon related to the event in a predetermined area in the inactive state and control a display degree of information related to the event based on a touch degree of a touch input applied to the notification icon.

Effect of the Disclosure

According to a mobile terminal and a control method thereof according to an embodiment of the present invention, a plurality of applications can freely be switched (shifted, moved) to one another according to a touch degree of a touch input applied to a display, and a desired specific task state in another application can immediately be run through a single touch input.

In addition, a background screen of a home screen can be set or selected information can automatically be input in the specific task state of the another application, through a single touch input.

Furthermore, a specific task state itself or a task result can always be displayed on a display in an inactive state, which may result in minimizing battery consumption and continuously confirming desired information.

BRIEF DESCRIPTION OF THE DRAWINGS

FIG. 1A is a block diagram of a mobile terminal in accordance with one embodiment of the present invention.

FIGS. 14A, 14B, 15A, 15B, 16A, 16B, 17A, 17B, 17C and 17D are views illustrating various examples of controlling a displayed screen in an inactive state of a display unit, using a touch input, in a mobile terminal according to the present invention.

FIGS. 18A, 18B, 18C, 19A, and 19B are exemplary views illustrating a method of displaying event-related information upon an occurrence of the event in an inactive state of a display unit, in a mobile terminal according to the present invention.

FIGS. 20, 21A, 21B, 22A and 22B are exemplary views illustrating a method of setting or changing a type and position of information displayed in an inactive state of a display unit, using a touch input, in a mobile terminal according to the present invention.

BEST MODE FOR CARRYING PREFERRED EMBODIMENTS

Figure 1B:
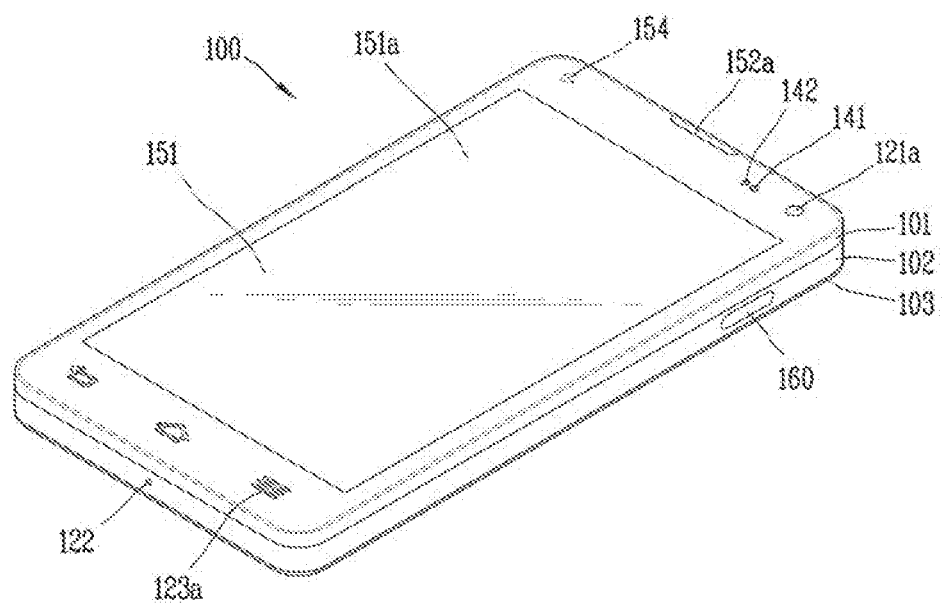
FIGS. 1B and 1C are conceptual views illustrating one example of a mobile terminal according to the present invention, viewed from different directions.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1C:
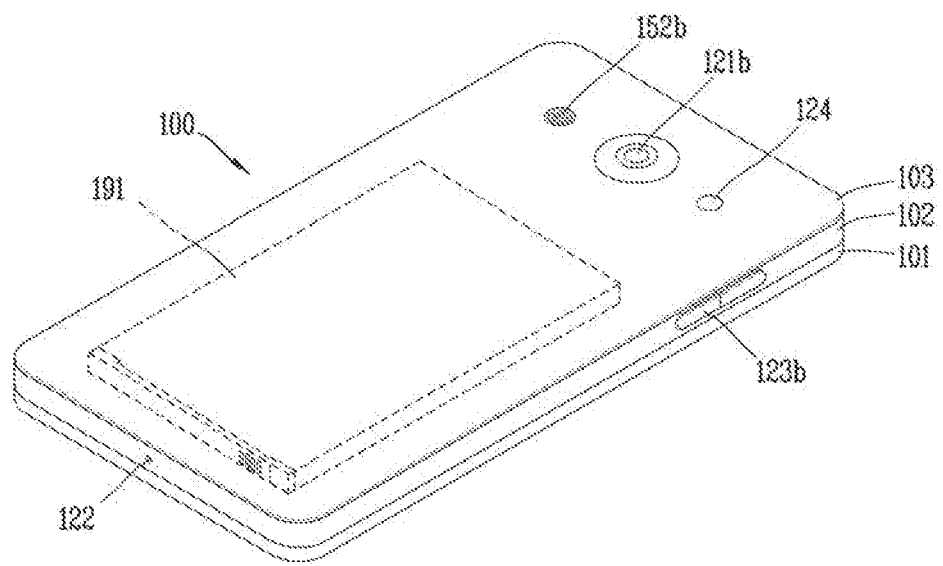

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Next, the input unit 120 is for inputting image information (or signal), audio information (or signal), data, or information input from a user. For inputting image information, the mobile terminal 100 may be provided with a plurality of cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present invention may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, embodiments related to a control method that can be implemented in a mobile terminal configured as above will be described with reference to the accompanying drawings. It will be apparent to those skilled in the art that the present invention may be embodied in other specific forms without departing from the spirit or essential characteristics thereof.

In the present invention, the display unit 151 (or the touch sensor provided in the display unit 151) detects (senses) a touch degree of a touch input applied through the display unit 151, that is, intensity of pressure, to generate a corresponding touch signal. To this end, the display unit 151 (or the touch sensor provided in the display unit 151) may include a plurality of piezoelectric elements. The generated touch signal includes information related to pressure intensity (or piezoelectric strength) of the touch input. The generated touch signal is transmitted to the controller 180 and an operation corresponding to the generated touch signal is performed.

Figure 2:
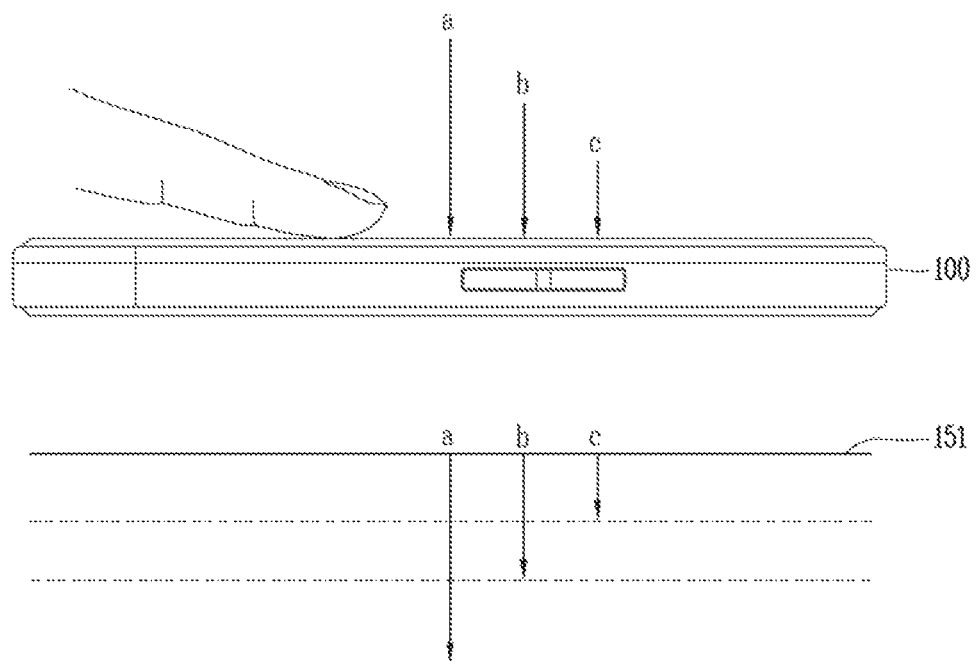
FIG. 2 is a view illustrating a touch degree of a touch input applied to a display unit in a mobile terminal according to the present invention.

In this regard, FIG. 2 is a view illustrating a touch degree of a touch input applied to a display unit in a mobile terminal according to the present invention.

As illustrated in FIG. 2, touch pressure corresponding to a user's touch operation applied to the display unit 151 of the mobile terminal 100 may be variously detected (a, b, c), and the controller 180 may perform an operation matching the touch pressure of the detected touch input. To this end, the controller 180 may detect a voltage corresponding to the touch pressure, and then generate a different touch signal according to the detected voltage.

For example, when the user presses the display unit 151 with intensity 'c', a voltage of a minimum touch voltage level (e.g., 0.04 V or less) may be detected and a first touch signal may be generated accordingly. In addition, when the user presses the display unit 151 more strongly with intensity 'b', a voltage in the range of 0.04 to 1.5 v may be detected and a second touch signal may be generated accordingly. When the user presses the display unit 151 much more strongly with intensity 'a', a voltage of a maximum voltage level or in the range of 1.5 to 3.0 v may be detected and a third touch signal may be generated accordingly. Here, the first, second, and third touch signals may be input values for executing different control commands, respectively. That is, the intensity of the pressure of each touch operation may be converted into a voltage value and used as a different input value.

The voltage level and the voltage value are merely illustrative and may be variously set. The foregoing description has been given of such three separate pressure intensities of the touch operation, but the present invention is not limited to this. More or less pressure intensities can be set, of course. Also, two separate operations according to pressure intensities have been described by defining a reference voltage, but more operations may be implemented.

Also, the display unit 151 of the mobile terminal 100 according to the embodiment of the present invention may be switched (or changed) from one of an active state and an inactive state to another, and output predetermined information when the state of the display unit 151 is switched from the active state to the inactive state.

In other words, the mobile terminal 100 according to the present invention may activate an always-on-display (AOD) function for always displaying specific information even when a screen of the display unit 151 is turned off. This can be realized by using a low power mode of an organic light-emitting diode (OLED) display or by embedding an electronic ink in a rear surface of the mobile terminal 100. A detailed description thereof will be omitted.

Figure 3:
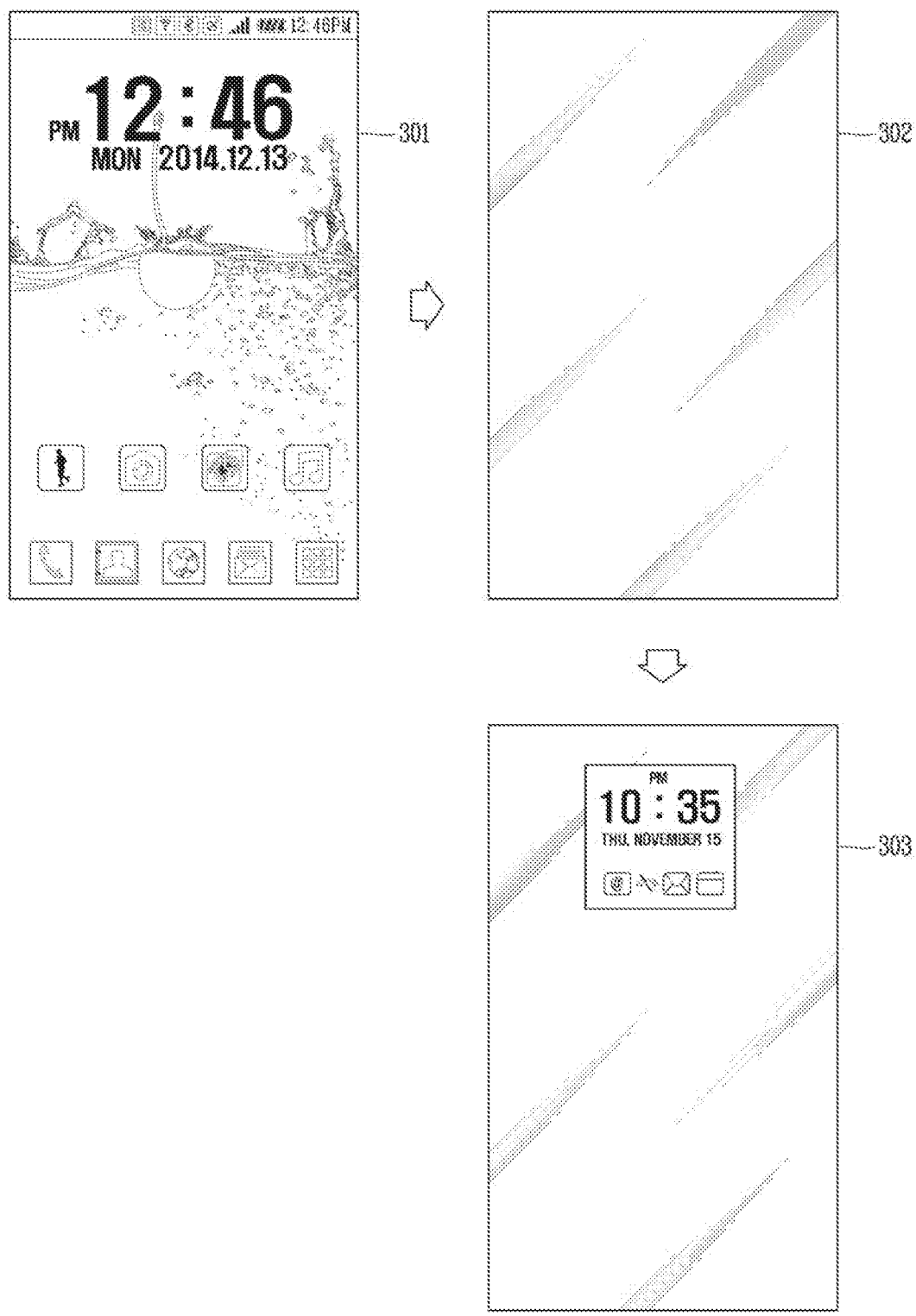
FIG. 3 is a view illustrating a state where predetermined information is displayed when a display unit is switched to an inactive state in a mobile terminal according to the present invention.

FIG. 3 is a view illustrating a state where specific information is displayed while the display unit 151 is in the inactive state.

The specific information may be displayed simultaneously when the screen of the display unit 151 is turned off. Alternatively, the specific information, as illustrated in FIG. 3, may be displayed on the display unit 151 after a screen (e.g., a home screen) 301 is turned off (302) and then a predetermined time (e.g., 0.2 to 0.3 sec) elapses.

In addition, as illustrated in FIG. 3, the specific information may include time information, received event information such as a received message, a call and the like. In FIG. 3, the specific information is displayed only in a predetermined area, for example, a part of an upper area of the display unit 151. However, this is merely illustrative, and position and size of the area may be variously modified. For example, it is needless to say that the entire display unit 151 can be used to display the specific information in its inactive state.

In addition, the specific information may be displayed at brightness of a reference value or less to minimize battery consumption of the mobile terminal 100. In this case, the controller 180 may automatically adjust output brightness of the displayed specific information according to a proximity touch (including a touch) to the display unit 151, an illuminance value around the mobile terminal 100, and the like.

Figure 4:
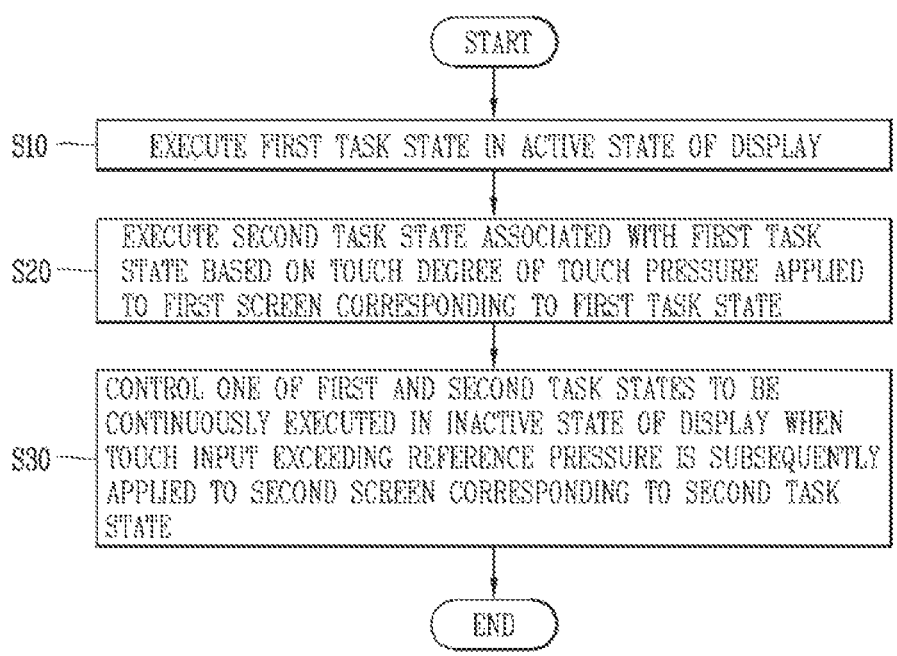
FIG. 4 is a flowchart illustrating a representative operation of a mobile terminal according to the present invention.

Hereinafter, FIG. 4 is a flowchart illustrating a representative operation of a mobile terminal according to the present invention.

First, a first task (operation, work) state is executed when the display unit 151 (FIG. 1A) of the mobile terminal 100 (FIG. 1A) is in an active state (S10). Here, the first task state may be a specific execution step of a specific application installed in the mobile terminal 100, for example, a display step of a photo image stored in a specific folder in a gallery application, a transfer step in a financial application, or the like. In addition, the first task state may be a display state of a home screen or lock screen itself. That is, the first task state includes all kinds of task states that can be executed while the screen of the display unit 151 is turned on, and one application includes a plurality of different task states to be executable.

Next, the controller 180 of the mobile terminal 100 may execute a second task state associated with the first task state based on a touch degree of a touch input applied to a first screen corresponding to the first task state (S20).

That is, the controller 180 may execute a different operation based on a touch degree of a touch input applied to the first screen. For example, a first control command may be executed when a touch input within reference pressure is applied to an arbitrary point on the first screen, and a second control command different from the first control command may be executed when a touch input exceeding the reference pressure is applied.

Here, the reference pressure refers to a touch degree in which a voltage detected by a touch forms a reference voltage range (for example, within 1.5 v). Accordingly, the touch input within the reference pressure refers to a touch operation having touch pressure in which a voltage detected by a touch applied to an arbitrary point or a specific area of the display unit 151 is formed within a reference voltage range (e.g., 0.04 to 1.5 v). Also, the touch input exceeding the reference pressure refers to a touch operation having touch pressure in which a voltage detected by a touch applied to an arbitrary point or a specific area of the display unit 151 is within a voltage range (e.g., 1.5 v to 3.0 v) exceeding the reference voltage range.

Also, the second task state refers to an execution state of an operation entered through any one of the first control command and the second control command. The second task state may be decided according to a touch degree of a touch input applied in the first task state and information output at a point where the touch input is applied.

In addition, the second task state may be another execution step of the same application as the first task state, or may be a specific execution step of an application different from the first task state. Alternatively, the second task state may refer to the next task state to be executed in association with the first task state.

Also, the second task state may be changed to a different execution step from an initial state according to the number of applied times, a duration, and a varied degree of the touch input exceeding the reference pressure, applied in the first task state.

If a touch input exceeding the reference pressure is subsequently applied to a second screen corresponding to the second task state, the controller 180 may control the screen such that one of the first and second task states is continuously executed in the inactive state of the display unit 151 (S30).

That is, when a touch input having touch pressure forming a voltage range (e.g., 1.5 to 3.0 V) exceeding a reference voltage range is applied to an arbitrary point or a specific area of the second screen, the controller 180 may switch the screen of the display unit 151 to an off state and then display a screen corresponding to the first task state or the second task state in the off state. That is, while the display unit 151 is in the inactive state, an execution screen of a specific operation state can be continuously displayed instead of predetermined information. Alternatively, the predetermined information and the execution screen of the specific operation state may be simultaneously displayed.

Also, the controller 180 may control the first or second task state to be continuously executed even after the touch input applied to the second screen is released.

Also, the execution screen of the first or second task state, which is displayed while the screen is in the off state, may be displayed in black and white in consideration of the battery consumption. In addition, the execution screen may be displayed while being moved at predetermined time intervals to prevent burn-in due to a continuous display of specific information.

On the other hand, in an exceptional situation such as when the mobile terminal 100 is in a pocket or bag of the user, when a cover is mounted, when the mobile terminal 100 is placed on the floor with being turned over, the predetermined information or the execution screen of the first or second task state may not be displayed. In this case, the predetermined information or the execution screen of the first or second task state may be re-displayed on the display unit 151 when the exceptional situation is terminated, for example, when the user takes the terminal out of the pocket or bag. This may be detected through an illuminance sensor provided in the mobile terminal 100, and the operation can be performed through the controller 180.

As described above, according to the embodiment of the present invention, a desired specific task state can be executed more fast by using a touch input. In particular, more improved interaction can be provided to the user in terms of immediately entering a specific task state of another application. In addition, the user can constantly check a screen of a desired task state in a screen-off state, thereby minimizing battery consumption.

Figure 5:
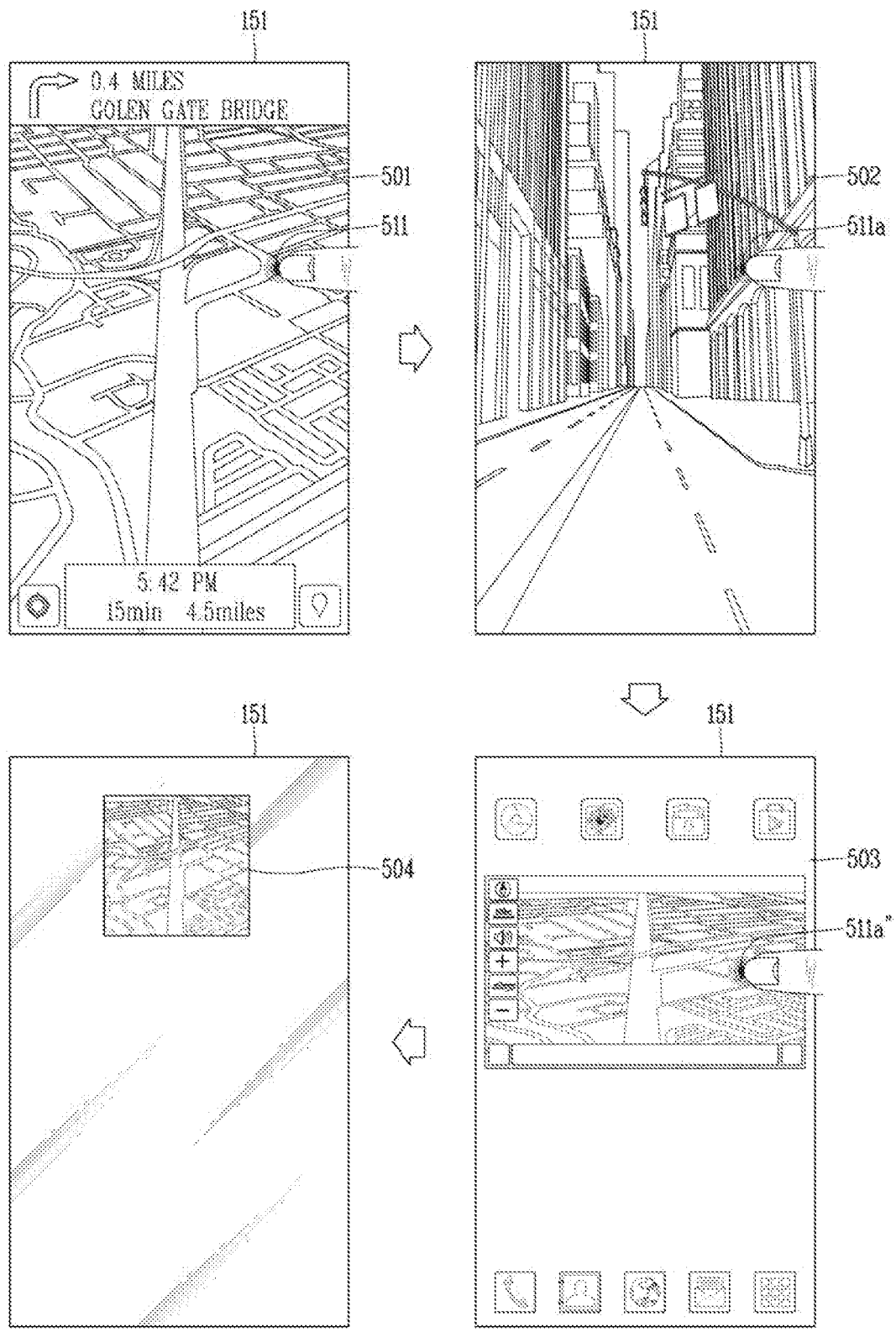
FIG. 5 is a conceptual view illustrating detailed operations of FIG. 4.

FIG. 5 is a conceptual view illustrating detailed operations of FIG. 4.

First, an execution screen 501 of a navigation application installed in the mobile terminal 100 or received from an external device connected to the mobile terminal 100 may be output to the display unit 151. When a touch input is applied to one point of the displayed execution screen 501, the controller 180 may perform a different operation according to a touch degree of the applied touch input.

For example, if a touch input within the reference pressure is applied to an arbitrary point on the execution screen 501, information related to the point may be displayed or the execution screen 501 may be reconstructed based on the point.

Or, as illustrated in FIG. 5, if a touch input exceeding the reference pressure is applied to an arbitrary point on the execution screen 501 (511), a road view screen of a position corresponding to the touch-applied point may be entered. To this end, the controller 180 may execute a linked road view application, search for the position, which corresponds to the touch-applied point on the execution screen 501, and then display a road view screen 502 on the display unit 151. That is, by applying the touch input that exceeds the reference pressure, a specific step of another application associated with the currently-executed application may be directly entered.

When the touch input 511 is released in the state that the execution screen 501 has been switched to the road view screen 502, the road view screen 502 may be switched back to the previous execution screen 501. Accordingly, a convenience function of temporarily checking a road view screen of a specific position is provided.

On the other hand, if a touch input exceeding the reference pressure is continuously applied (511a) while the road view screen 502 is displayed, the execution screen of the navigation application or the road view screen may be displayed on a home screen 503. That is, a first task state (the execution screen of the navigation) or a second task state (the road view screen) exits to the home screen 503 and is continuously displayed in the form of a floating window. However, this process may be omitted in one example. That is, if the touch input exceeding the reference pressure is continuously applied to the road view screen 502 (511a), the following operation may be performed immediately instead of the aforementioned operation.

Specifically, when a touch input exceeding the reference pressure is applied to the screen (511a or 511a") in the state (503) in which the road view screen 502 or the floating window is displayed, the controller 180 may switch the display unit 151 to the inactive state. The controller 180 may continuously display the road view screen 502 or the execution screen 501 of the navigation application, instead of information (e.g., time information) originally displayed in the inactive state of the display unit 151. At this time, the execution screen 504 which is displayed in the inactive state of the display unit 151 may be displayed in black or white in a predetermined area or an entire area in order to minimize battery consumption.

According to the aforementioned embodiment, the navigation can be continuously used during driving with minimizing power consumption of the mobile terminal.

Figure 6:
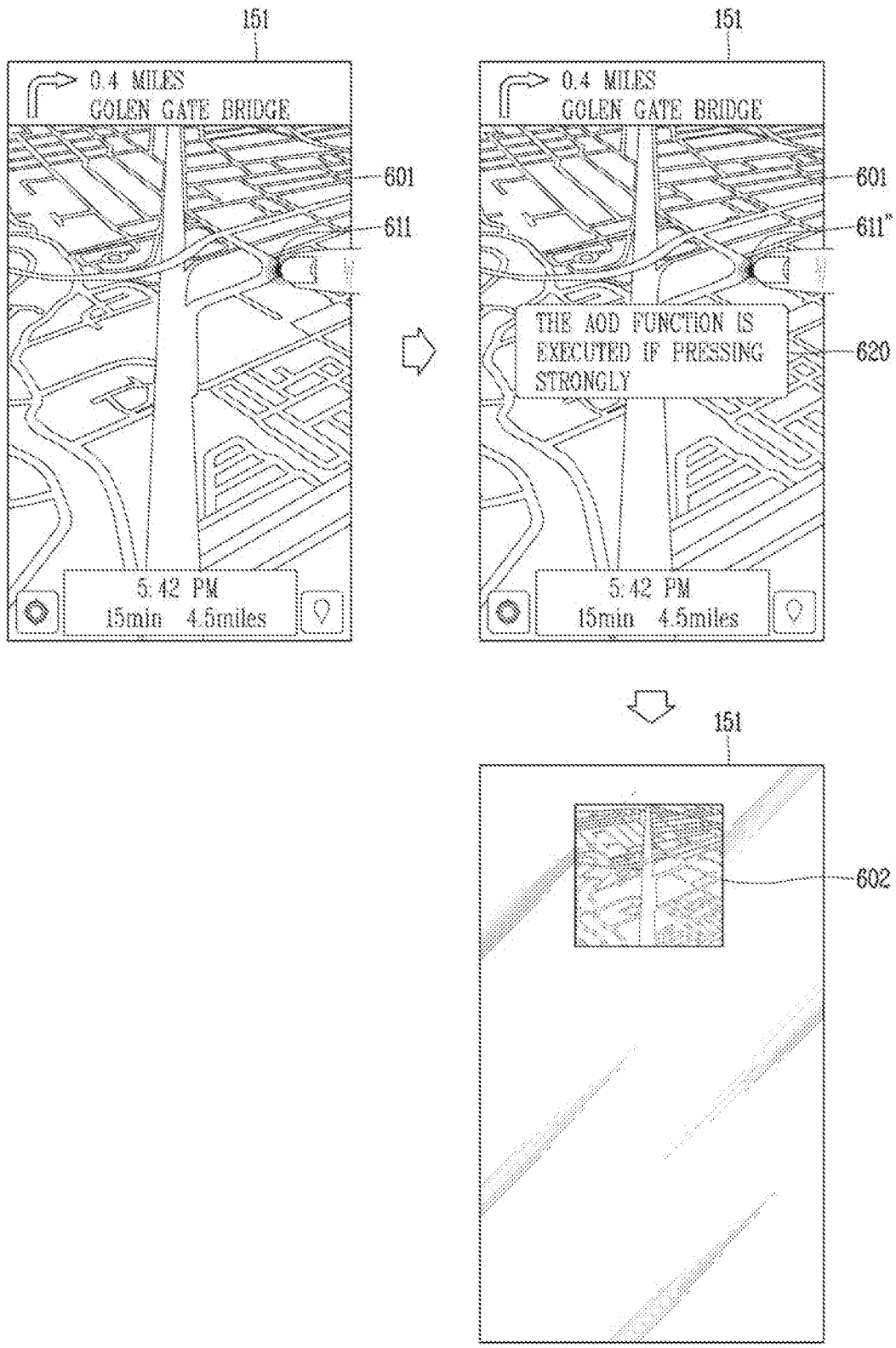
FIGS. 6, 7, 8, 9, 10, 11, 12, and 13 are views illustrating various examples of methods of continuously displaying a current task state in an inactive state according to a touch degree of a touch input applied to a display unit, in a mobile terminal according to the present invention.

In an example, as illustrated in FIG. 6, the user may be notified or guided in advance that the execution screen of the navigation application can be continuously displayed in the inactive state of the display unit 151.

Specifically, as aforementioned, when a first task state is switched to a second task state or when a touch input is applied to an execution screen of the first task state as illustrated in FIG. 6 (611), the controller 180 may display guide information in advance on the display unit 151 to indicate that the first task state or the second task state can be executed in the inactive state of the display unit 151.

For example, a message ('The AOD function is executed if you press strongly.') to prompt a user input to execute the first or second task state may be popped up (620). In response to the pop-up message (620), when a touch input exceeding the reference pressure is applied, the display unit 151 is switched to the inactive state, and the first task state or the second task state is executed as an ongoing event on the display unit 151.

Meanwhile, although not shown, in one example, the controller 180 may display only a notification icon (not shown) for indicating that the display unit 151 is to be switched to the inactive state in a state where a touch input exceeding the reference pressure is continuously applied (i.e., maintaining the active state), and may switch the display unit 151 to the inactive state only when the applied touch input is released.

Hereinafter, FIGS. 7, 8, 9, 10, 11, 12, and 13 are views illustrating various examples of continuously displaying a currently-executed task state in an inactive state according to a touch degree of a touch input applied to a display unit, in a mobile terminal according to the present invention.

As described above, the second task state is determined differently according to a touch degree and a touch point of a touch input applied to the display unit 151 in the first task state, which is executed in the active state of the display unit 151.

Specifically, even when a touch input exceeding the reference pressure is applied to a first screen, the controller 180 may execute a different task state according to an attribute, for example, according to whether information output on a touch point of the touch input is an image, text, setting information, a menu object, an icon of an application, or the like.

In addition, the second task state may be a lower execution step of the same application as the first task state or an execution step associated with the first task state in an application different from the first task state (for example, a lower execution step with respect to the first task state). Particularly, in the latter case, it is possible to freely shift between a plurality of applications according to a touch degree of a touch input, and it is also possible to directly enter a desired specific step rather than a home screen in a different application through one touch input.

In addition, in the present invention, a specific execution step itself can be brought to the inactive display unit 151 by using a touch input, and accordingly battery consumption can be minimized while continuously checking an execution screen.

Figure 7:
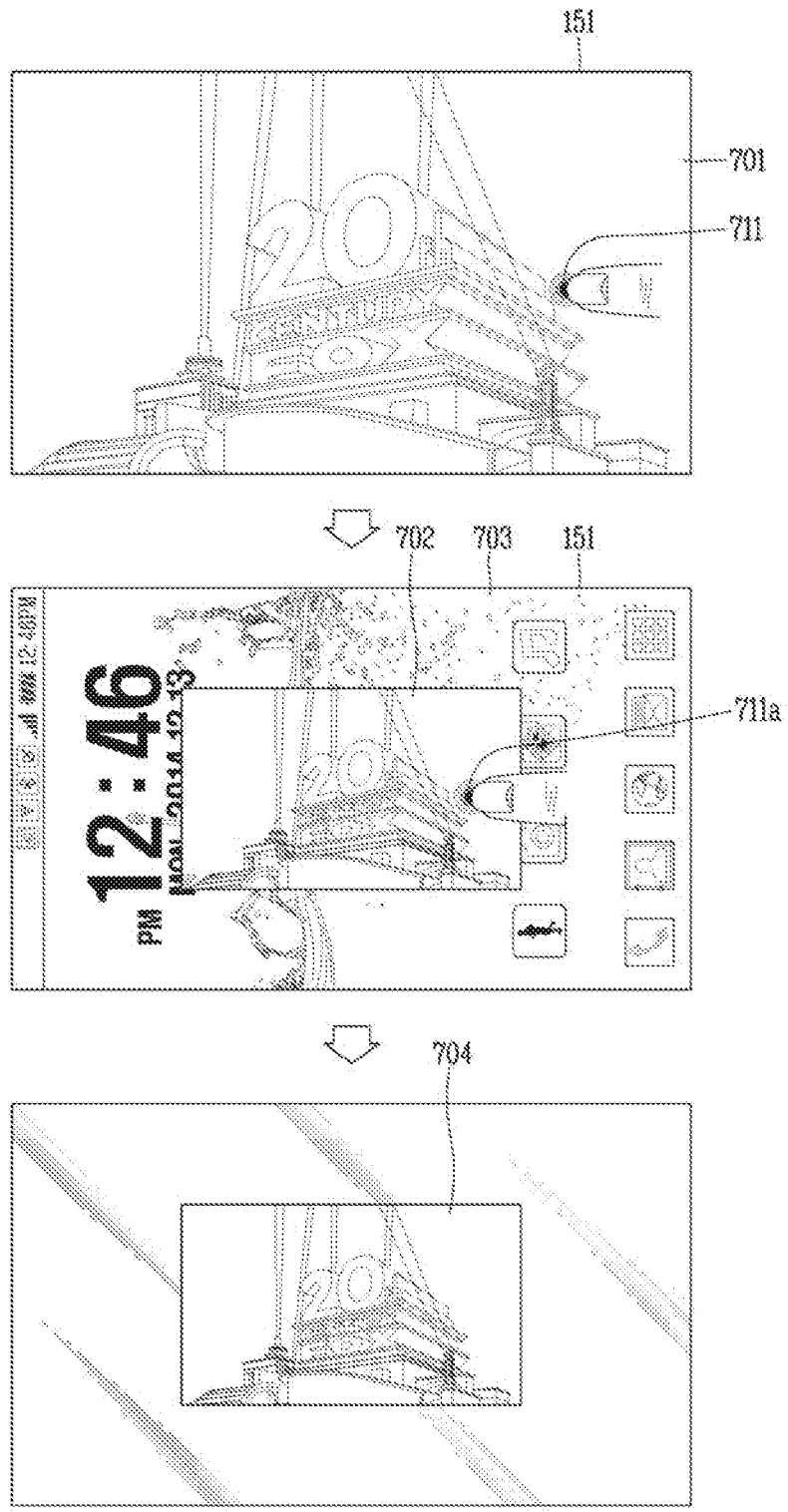

In one embodiment, FIG. 7 is a view illustrating an embodiment in which a currently-reproduced video (moving image) screen 701 is brought to the display unit 151 in the inactive state.

If a touch input exceeding the reference pressure is applied to an arbitrary point of the currently-reproduced video screen 701 (711), the currently-reproduced video screen 701 moves onto a home screen 703 and is displayed thereon in the form of a floating window (702).

In this state, if the touch input exceeding the reference pressure is consecutively applied (711a), the display unit 151 is switched to the inactive state and the video screen 704 is reproduced in a predetermined area of the display unit 151. As such, only a specific area of the display unit 151 is turned on to reproduce a video screen, thereby greatly reducing battery consumption.

At this time, the controller 180 may decide a display direction of the video screen 704, which is output in the inactive state of the display unit 151, based on a display direction of the video screen 701 in the active state of the display unit 151. For example, as illustrated in FIG. 7, when the display unit 151 is switched from the active state to the inactive state while the video screen 701 is being output in a horizontal direction in the active state of the display unit 151, the video screen in the horizontal direction is also floated (704).

In addition, the controller 180 may differently decide a position, a size and whether or not to output in black and white with respect to an area to output information when the display unit 151 is switched to the inactive state, according to a size, a position and a content type of a screen which has been output in the active state of the display unit 151. For example, the video screen 701 may be output as a color image even when the display unit 151 is in the inactive state, and may be displayed in an enlarged size than the predetermined area. On the other hand, sounds to be synchronized with the video screen 701 may be more reduced in volume by a predetermined value than sounds output in the active state.

Figure 8:
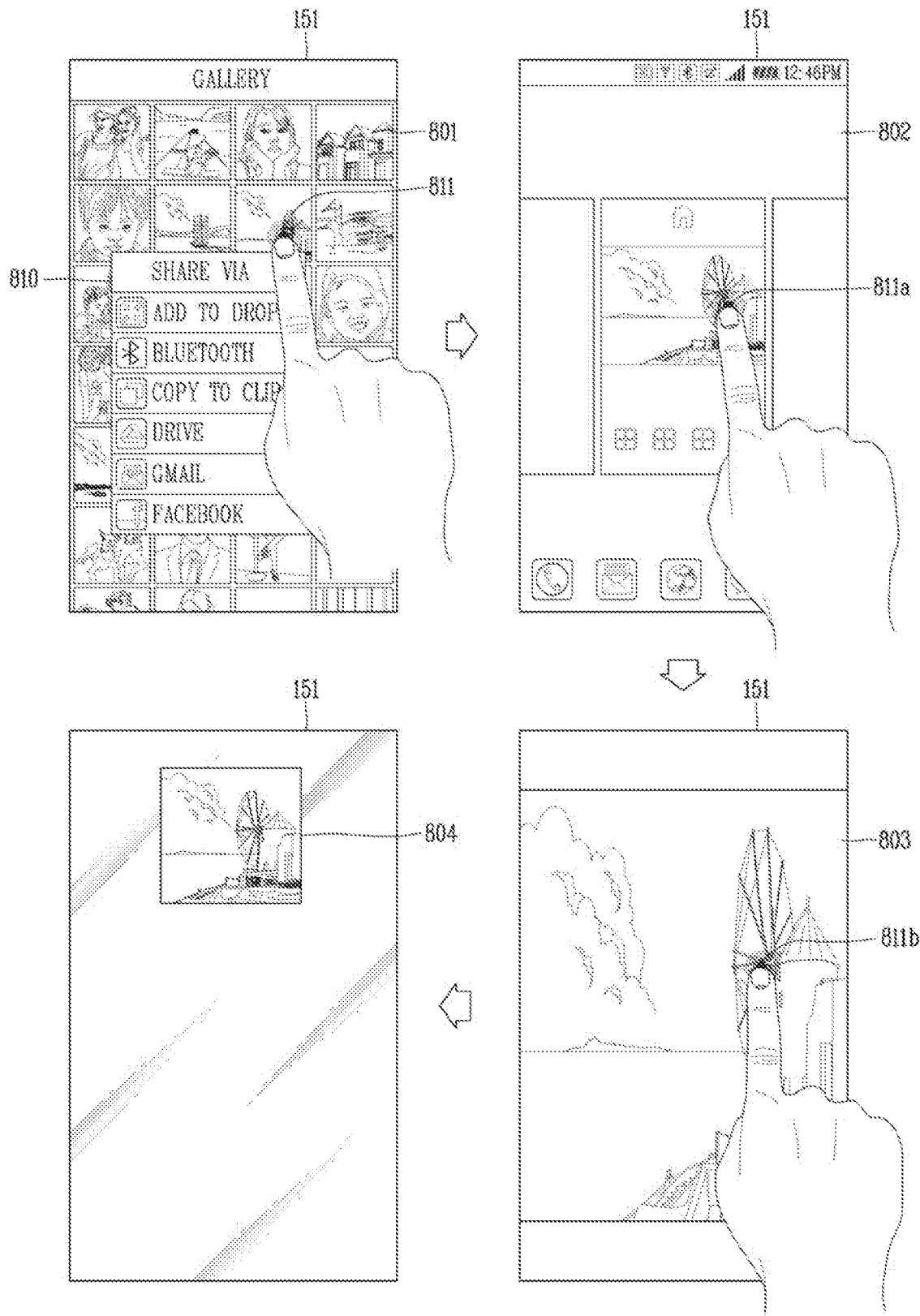

As another embodiment, FIG. 8 is a view illustrating an example of fast setting a displayed image 811 as a background screen of a home screen or the display unit 151 in the inactive state.

Referring to FIG. 8, in a state where a plurality of images is output to the display unit 151 in the form of a list (801) in response to an execution of a gallery application, when a touch input exceeding the reference pressure is applied to a specific image 811, a menu window 810 for executing an associated detailed function is popped up. Next, when the touch input exceeding the reference pressure is consecutively applied to the specific image 811, the controller 180 may directly set the selected specific image 811 as the background screen of the home screen. Alternatively, the background of the home screen may be set immediately instead of popping up the menu window 810.

To this end, the controller 180 may drive a second application associated with information output on a touch point of a touch input, which is applied in a first task state of a first application. Further, a second task state corresponding to a setting mode associated with the first task state may be executed in the driven second application.

FIG. 8 exemplarily illustrates that a specific image stored in a gallery application is selected as a first task state and a setting mode for changing a background screen of a home screen, which is a second task state, is directly entered.

At this time, the user can directly change the selected specific image as the background screen of the home screen without performing an additional operation in the entered setting mode. That is, as the touch input exceeding the reference pressure is applied to the specific image 811, the image list screen 801 of the gallery application is switched to a preview screen 802 of the background screen of the home screen. That is, the user can move from the first task state of the first application to the second task state for setting the background screen of the home screen by one touch input.

When the touch input is released in the state that the preview screen 802 of the background screen of the home screen is displayed, the selected specific image is set as the background screen and then the setting mode is ended. Thus, the home screen is displayed on the display unit 151.

Meanwhile, when the touch input exceeding the reference pressure is subsequently applied (811a) while the preview screen 802 is displayed, the selected specific image may also be set as a background screen of a lock screen (803). Further, when the touch input exceeding the reference pressure is subsequently applied to the set background screen 803 of the lock screen (811b), the corresponding image may be checked even when the display unit 151 is in the inactive state (804). That is, the image may also be set as a background screen of the inactive state.

As described above, according to the present invention, a desired specific image can quickly be set as a background image of a home screen, a lock screen, and the inactive state of the display unit 151, on the basis of a touch degree of a touch input.

Meanwhile, although not shown, when the background image is set through the above-described process and the image of the set background image is continuously stored in the mobile terminal 100, the controller 180 may also directly enter a stored position of the corresponding image by varying the touch input exceeding the reference pressure.

For this purpose, when a touch input exceeding the reference pressure is applied to one point of a displayed background screen, information for guiding a movement to a position of an application in which the corresponding image is stored, for example, link information may be displayed in a form of a specific graphic object or the like, to facilitate a movement of a desired position through an input applied to the information. In addition, when the specific image is set as the background screen through such process, the controller 180 may link a first task state including the image of the background screen in advance.

Figure 9:
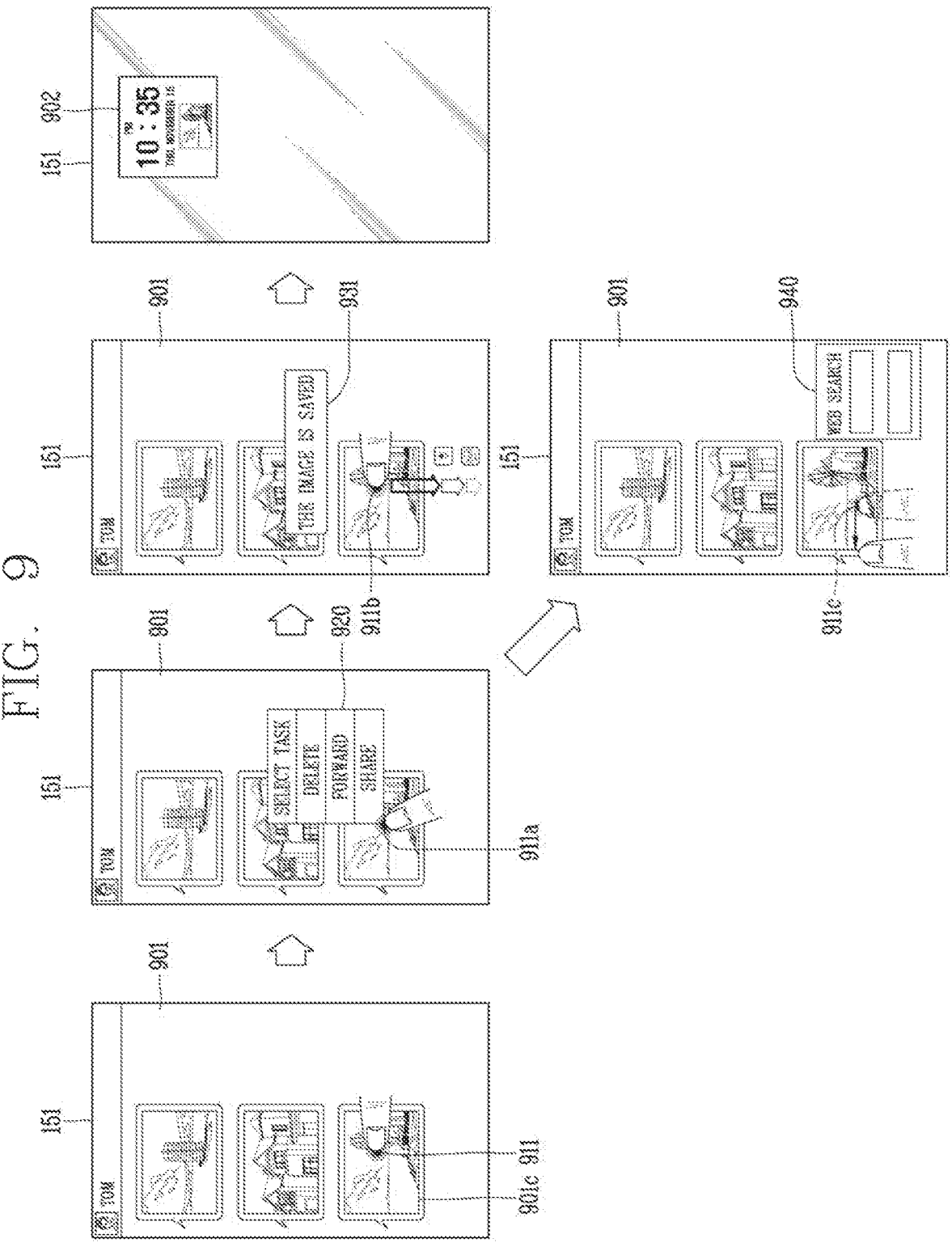

FIG. 9 is a view illustrating an example of storing a received image 901c in the mobile terminal 100 or searching for an image associated with the received image 901c and simultaneously or subsequently setting the image as a background image of a home screen or the display unit 151 in the inactive state. That is, FIG. 9 illustrates an example of processing a plurality of tasks or operations at once.

As shown in FIG. 9, images may be received through a message application or the like. At this time, the received images are only displayed on a dialog screen 901 before the user inputs a separate operation for storage. As such, an image which is displayed on the dialog screen 901 without being stored yet may not be set as a background image of a home screen, a lock screen, or the display unit 151 in the inactive state.

In FIG. 9, when a touch input is applied to the received specific image 901c in the displayed dialog screen 901, an operation window 920 related to processing of the received image is popped up. At this time, when a touch input exceeding the reference pressure is successively applied without selecting a specific menu in the popped-up operation window 920, the popped-up operation window 920 disappears and a second task state of storing the received specific image is executed. Accordingly, a guide object 931 indicating that the image 901c can be stored may appear and then disappear on the dialog screen 901. In this state, when the applied touch input is released, the corresponding image 901c is stored in a predetermined area, for example, a specific folder of a gallery.

Meanwhile, in the second task state for storing the received specific image, when the touch input exceeding the reference pressure is dragged in a preset direction without being released, the controller 180 may pop up a detailed menu associated with the second task state, namely, an operation select window related to an image storage.

At this time, the controller 151 may perform a different operation based on a direction that the touch input exceeding the reference pressure is dragged.

Specifically, when the touch input exceeding the reference pressure is dragged in a first direction, for example, an up and down direction (911b), a sub menu for selecting an area for storing the image may be displayed. On the other hand, when the touch input exceeding the reference pressure is dragged in a second direction, for example, a left and right direction, a web search result 940 for the image to be stored may be displayed, so as to continue an additional operation.

In addition, the controller 180 may selectively perform a function associated with the popped-up sub menu according to a dragged degree of the touch input exceeding the reference pressure.

For example, according to a degree that the touch input exceeding the reference pressure applied to the received image 901c in FIG. 9 is dragged down, any one of a plurality of icons indicating the area to store the image appears at a position corresponding to a dragged length. In this case, when the touch input is released as an icon matching the area to store the image 901c is displayed, the image 901c is stored in the area matching the corresponding icon. Alternatively, more web search results may appear, for example, depending on a degree that the touch input exceeding the reference pressure applied to the received image 901c in FIG. 9 is dragged to the left.

As described above, as the touch input exceeding the reference pressure is applied, the image 901c may be stored and simultaneously or subsequently the image 901c may be set as the background image of the home screen, the lock screen or the display unit 151 in the inactive state as illustrated in FIG. 9.

According to the embodiments described above, a plurality of operations related to a specific task state can quickly be executed at once by varying a touch degree of a touch input or dragging a varied touch input.

Figure 10:
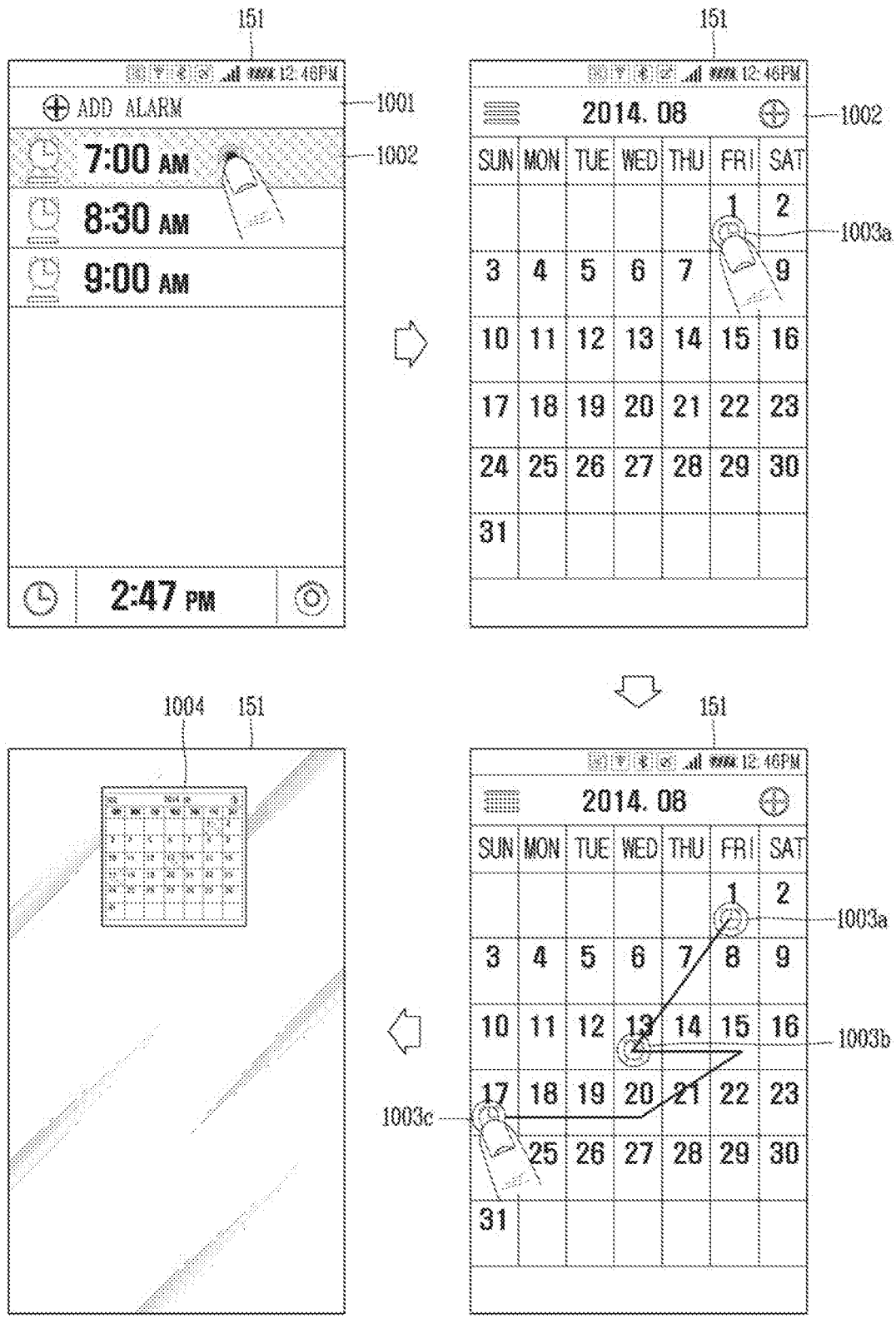

As another embodiment, FIG. 10 is a view illustrating an example in which a result of a second task state for fast applying information set through a first task state to another application can always be checked in the display unit 151 in the inactive state.

FIG. 10 exemplarily illustrates that a specific alarm time (7:00 AM) is set through an alarm setting screen 1001 by executing an alarm application. In this state, when a touch input exceeding the reference pressure is applied to a preset specific alarm time area, an execution screen of a second task state associated with a first task state, for example, the alarm setting screen 1001 may be switched to an alarm setting page 1002 of a calendar application.

When a touch input exceeding the reference pressure is applied to a date area to set an alarm, the controller 180 may set an alarm on the corresponding date to the alarm time set in the first task state. At this time, an alarm clock image 1003a may be displayed in the date area to which the touch input exceeding the reference pressure is applied, as illustrated in FIG. 10. In this case, the user may cancel the set alarm by applying a touch input to the alarm clock image 1003a.

Meanwhile, the touch input exceeding the reference pressure may be continuously applied to a plurality of date areas. In this case, alarm clock images 1003a, 1003b, and 1003c may be sequentially displayed in a plurality of date areas, respectively, to which the touch input exceeding the reference pressure is applied, like affixing a seal. Accordingly, a plurality of alarms can be quickly set on arbitrary dates in an irregular pattern.

When at least one setting information is input in the second task state by varying the touch degree of the touch input, the controller 180 may control the input setting information to be displayed in the inactive state of the display unit 151. In this case, when an input for switching the display unit 151 to the inactive state is applied, screen information 1004 including the setting information may be displayed, instead of predetermined information (e.g., time information, weather information, received event information, etc.), on the display unit 151 switched to the inactive state in the form of a floating window. Accordingly, the user can always confirm the setting information.

Figure 11:
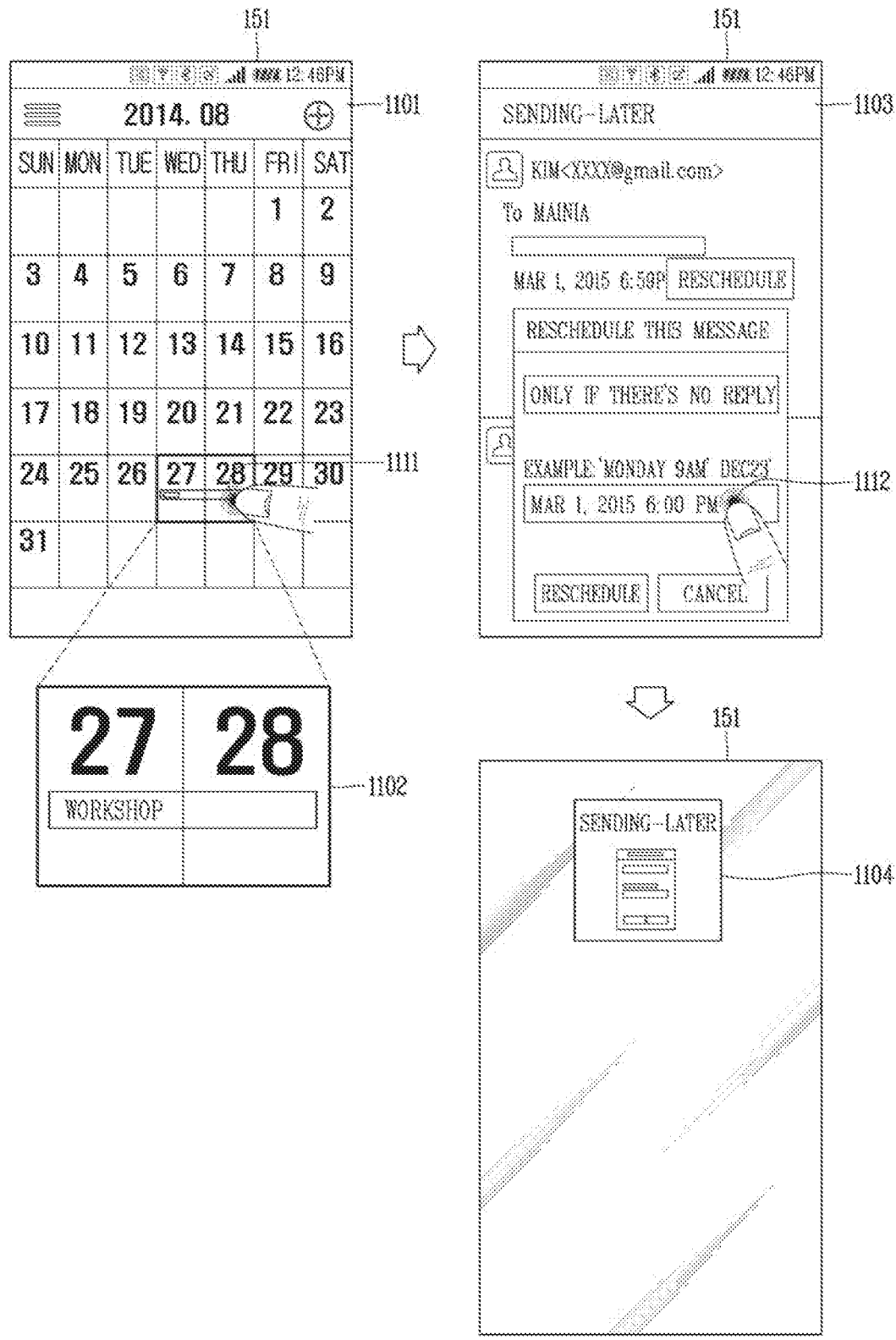

In another example, FIG. 11 illustrates that a schedule setting page 1101 of a schedule application is displayed on the display unit 151 as a first task state.

When a touch input exceeding the reference pressure is applied to an area 1102 in which a specific schedule (e.g., a workshop) is displayed in the displayed schedule setting page 1101, a specific task state of another application associated with the first task state, for example, an email sending-later page 1103 of an email application may be directly opened or entered. That is, the schedule setting page 1101 is switched to the email sending-later page 1103.

At this time, if the touch input exceeding the reference pressure is released within a reference time, the controller 180 may switch the email sending-later page 1103 to the schedule setting page 1101 that was previously output.

On the other hand, when the touch input exceeding the reference pressure is applied to a schedule menu 1112 after creating contents to be sent or confirming the contents in the email sending-later page 1103, the controller 180 may set sending-later (schedule) information to be continuously displayed in the inactive state of the display unit 151. At this time, if a scheduled time elapses, the sending-later information displayed on the display unit 151 in the inactive state may automatically disappear.

Figure 12:
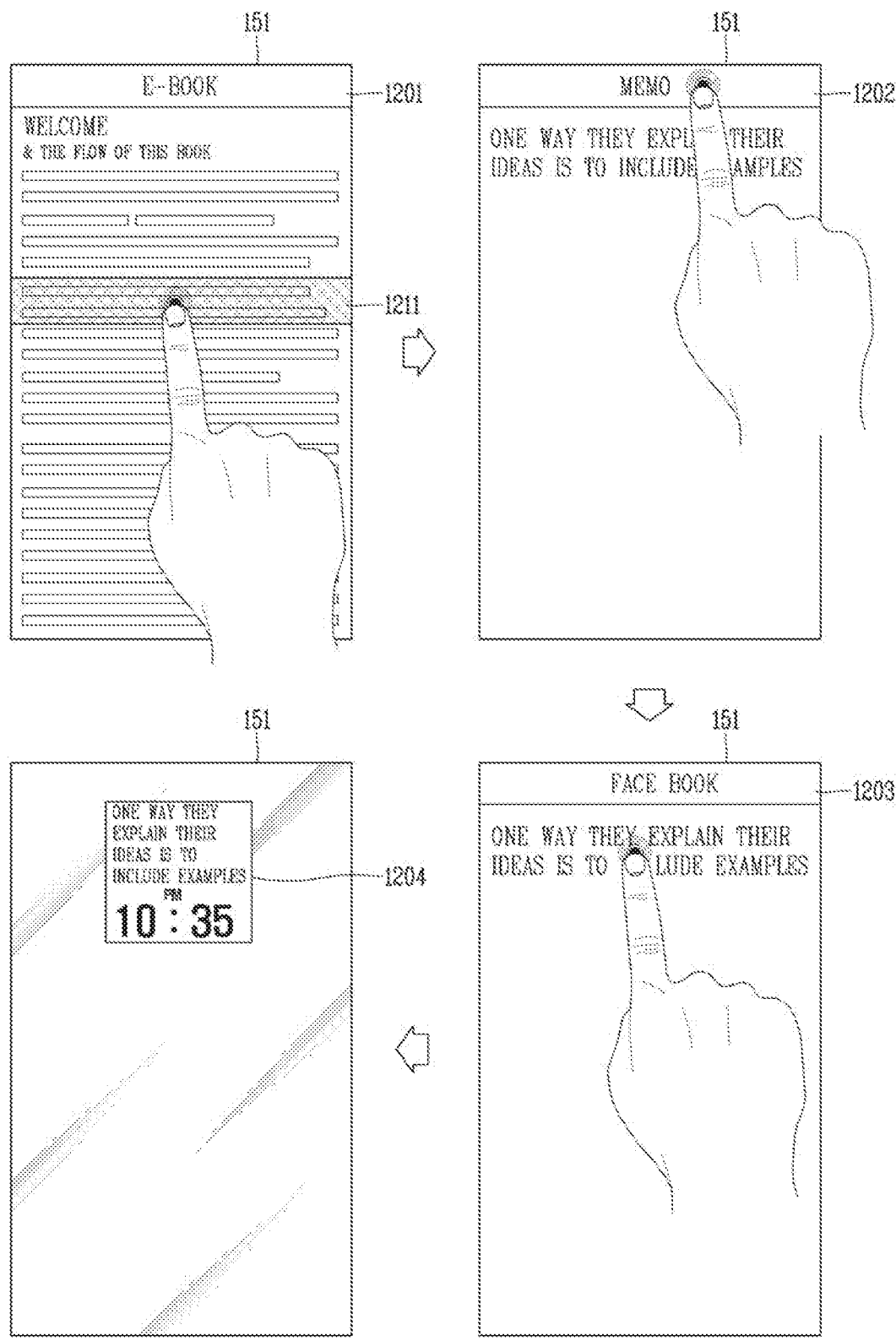

FIG. 12 is a view illustrating an example of a method of fast inputting text in an execution screen of another application or the display unit 151 in the inactive state when the text is selected in a first task state.

FIG. 12 illustrates that a specific page 1201 stored in an e-book application is output to the display unit 151 as a first task state.

The controller 180 may select a specific text from the output specific page 1201 according to a touch degree of a touch input. After the text is selected (1211), when pressure of the touch input exceeding the reference pressure increases without being released, the output specific page 1201 is automatically input to an execution screen of another associated application, for example, a memo application (1202).

According to this, a plurality of operations for copying a selected text, searching for and executing an application to paste the text, and pasting the text on a screen of the executed application, which has been performed in the related art, can be performed quickly by using a single touch input.

If the touch input is released while the execution screen of the memo application is displayed, an execution screen 1202 of the memo application may be immediately switched back to the specific page 1201 of the e-book application.

On the other hand, the controller 180 may switch a current screen to an execution screen of another application and continuously paste a selected text, according to a number of times the touch input exceeding the reference pressure is applied to a first area, for example, a top of the display unit 151. In this case, the controller 180 may determine the order in which applications are selected based on a user's usage pattern. For example, when a user's usage pattern recorded is that the user usually uploads text through an SNS application or transmits the text to a specific person using an e-mail, the mobile terminal 100 may first execute the SNS application or an e-mail application and automatically input the selected text.

Also, when the touch input exceeding the reference pressure is applied to a second area, for example, an area where the pasted text is displayed, the controller 180 may display the pasted text on the display unit 151 in the inactive state (1204). At this time, the pasted text may be displayed together with predetermined information, for example, time information.

Figure 13:
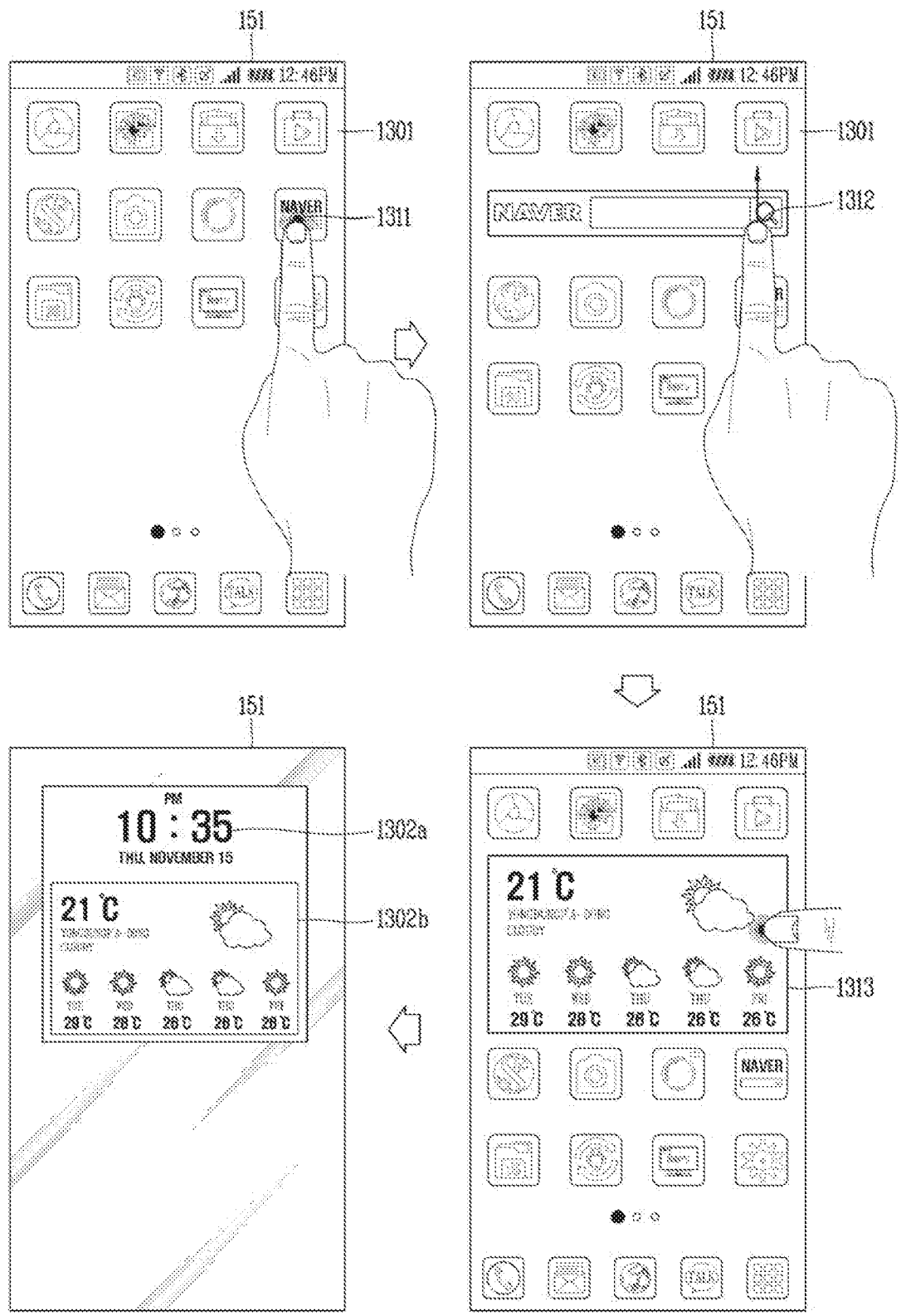

In another embodiment, FIG. 13 illustrates an example in which a home screen 1301 including icons and widgets of a plurality of applications is displayed on the display unit 151 as a first task state.

When the touch input exceeding the reference pressure is applied to a specific icon on the displayed home screen 1301, the controller 180 may first enter an edit mode of the icon (not shown), and when the reference pressure is maintained for a predetermined time, the controller 180 may automatically enter a widget setting mode of an application corresponding to the icon 1311. Accordingly, when downloading the application corresponding to the icon 1311, one of widgets downloaded together is output (1312).

In the widget setting mode, when a flicking touch input is applied to a top or bottom of the displayed widget 1312, the controller 180 may change the displayed widget 1312 to another associated widget 1313.

In the state where the desired widget is displayed (1313), when the touch input exceeding the reference pressure is then applied to the widget 1313, the controller 180 may additionally display the widget in one area of the display unit 151 in the inactive state (1302*b*). In this case, the displayed widget 1302*b* and time information 1302*a* may be controlled independently. For example, although not shown, if a drag touch input is applied to an area of the widget 1302*b* in a left and right direction, the time information 1302*a* may be continuously displayed but the widget 1302*b* may be switched to another preset widget.

According to the embodiments described above, a plurality of applications can freely be switched to one another and also a specific step desired by a user can be directly accessed to continuously perform a specific task, according to a touch degree of a touch input. In addition, the specific step or the executed task can be continuously displayed while the display unit is in the inactive state, thereby satisfying user convenience and minimization of power consumption at the same time.

Hereinafter, various examples of a method of controlling information displayed while the display unit is in the inactive state, by using a touch input, will be described.

Figure 14A:
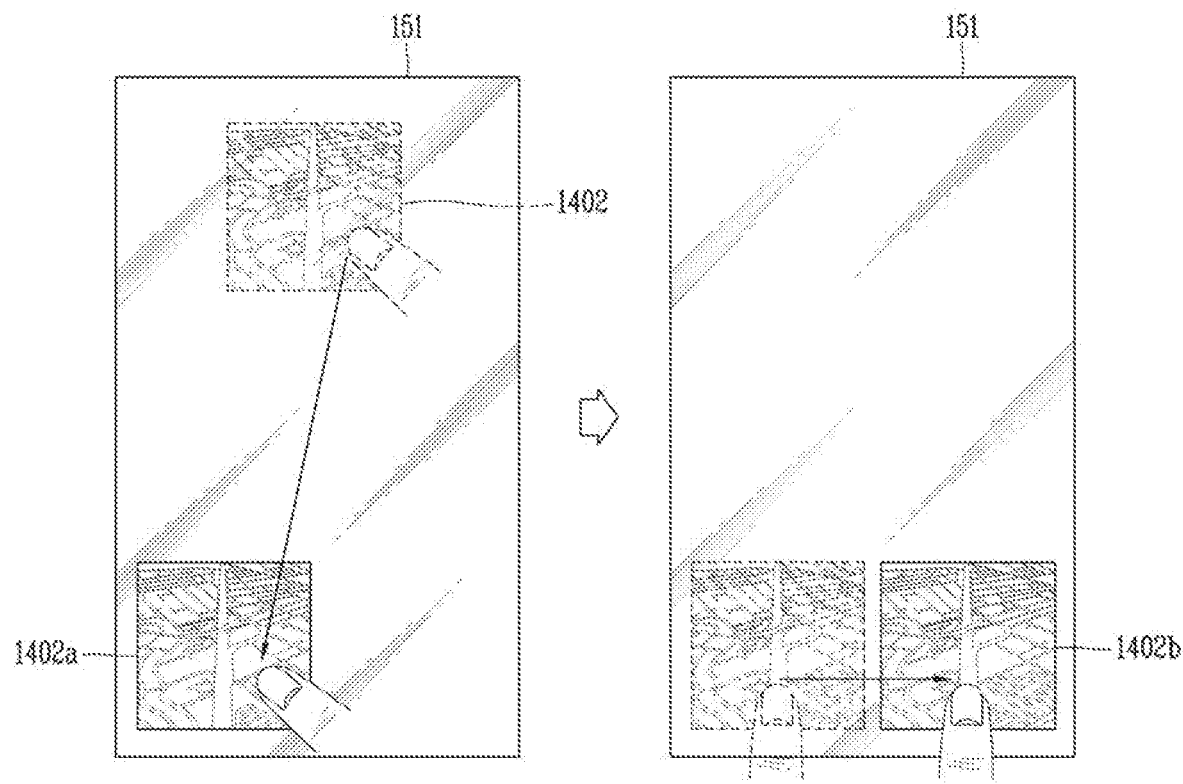
Figure 14B:
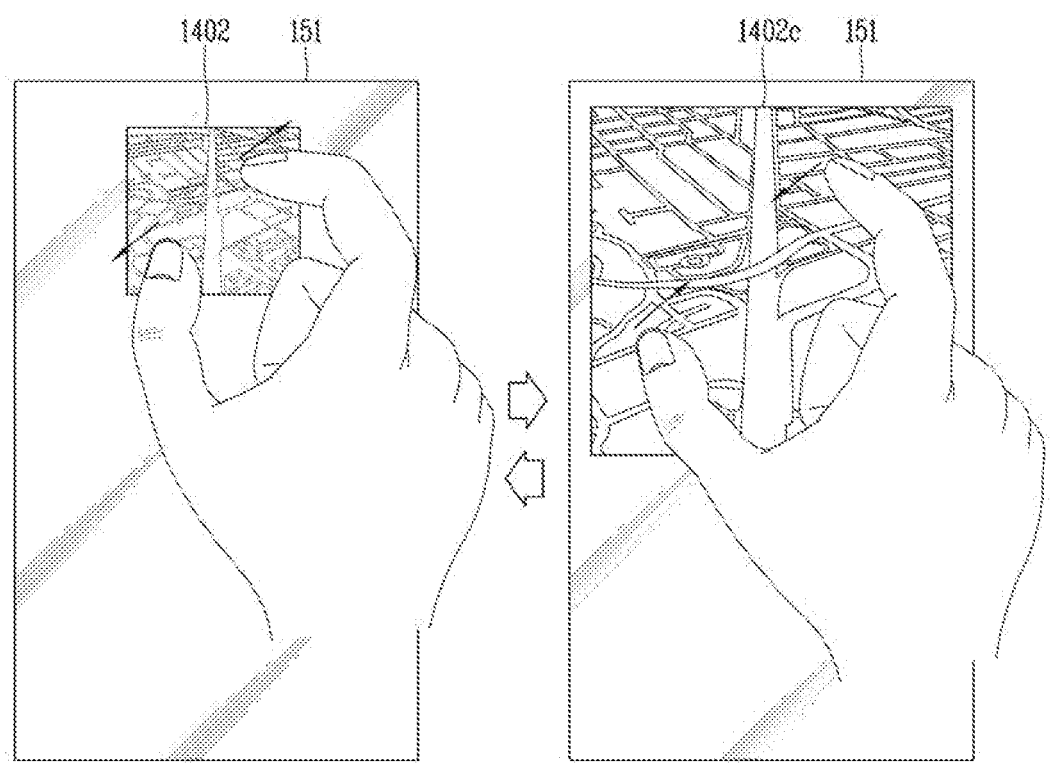

First, FIGS. 14A and 14B are exemplary views illustrating a method of changing a position and size of a screen area corresponding to a currently-executed task state while one of first and second task states is executed on the display unit 151 in the inactive state.

Specifically, while one of the first and second task states is executed in the inactive state, the controller 180 may change at least one of position and size of a screen area, which corresponds to the executed task state, in the inactive state of the display unit 151, in response to a touch input applied to the screen area.

For example, as the touch input exceeding the reference pressure applied to an arbitrary point within a navigation execution screen 1402 executed in the inactive state of the display unit 151 is dragged in a desired position, as illustrated in FIG. 14A, the controller 180 may change a current position of the navigation execution screen 1402 to a first position 1402*a* or a second position 1402*b* while maintaining the inactive state of the display unit 151.

Further, as illustrated in FIG. 14B, in the state in which the touch input exceeding the reference pressure is applied to the arbitrary point in the navigation execution screen 1402, when an interaction similar to a pinch-in/pinch-out touch input is executed by applying an additional touch input to another point in the execution screen 1402, the controller 180 may increase or decrease the size of the execution screen 1402 while maintaining the inactive state of the display unit 151. When the size of the execution screen 1402 is changed from 1402 to 1402*c* or from 1402*c* to 1402, as shown in FIG. 14B, the changed size can be fixed by releasing the applied touch input.

Figure 15A:
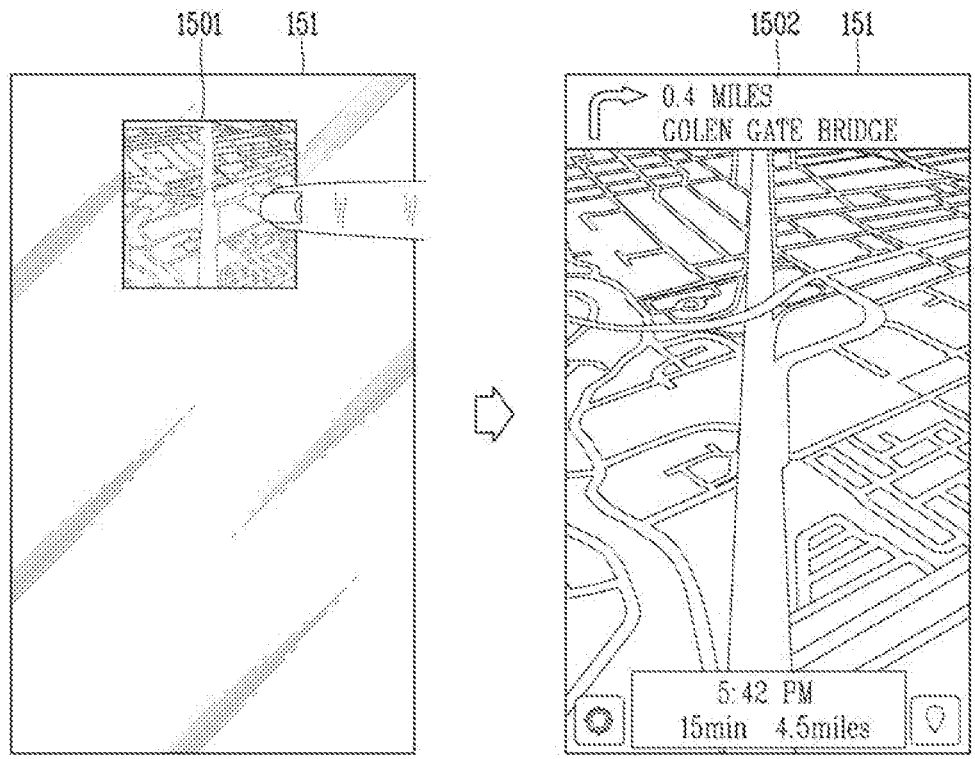
Figure 15B:
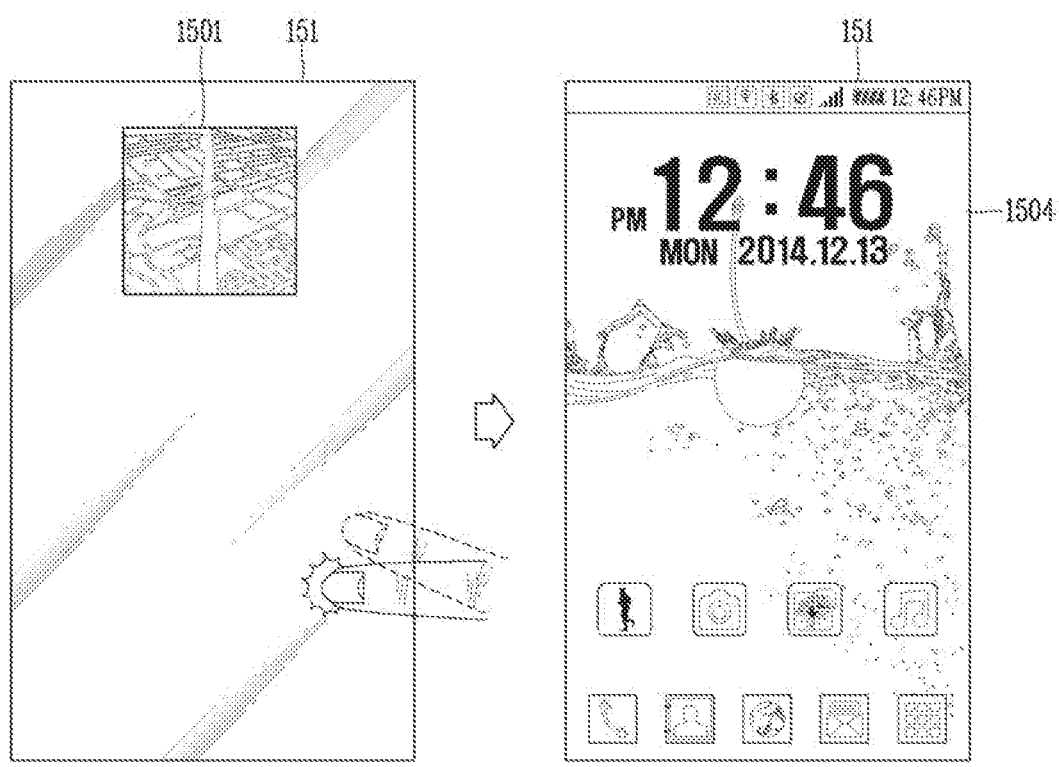

Next, FIGS. 15A and 15B exemplarily illustrate different operations for processing a task state, which was being executed in the inactive state of the display unit 151, when the display unit 151 is switched to the active state.

First, FIG. 15A illustrates an example of subsequently executing a task state that was being executed in the inactive state of the display unit 151 when the display unit 151 is switched to the active state. To this end, when a touch input exceeding the reference pressure is applied to a screen area corresponding to a currently-executed task state while one of the first and second task states is being executed in the inactive state, the controller 180 may switch the display unit 151 to the active state and output information, which is displayed in a screen area, to the entire display unit 151.

In FIG. 15A, as the touch input exceeding the reference pressure is applied to the navigation execution screen 1501 and then released, the screen is turned on and the navigation execution screen is displayed on the entire display unit 151.

On the other hand, when a plurality of taps is applied to an area outside the execution screen 1501 of the navigation as illustrated in FIG. 15B, the screen is turned on and a home screen 1504 or a screen, which was output on the display unit 151 just before the display unit 151 is switched to the inactive state, is displayed.

In this case, when the user turns on the display unit 151, the user can select whether to continue or terminate the current task.

Figure 16A:
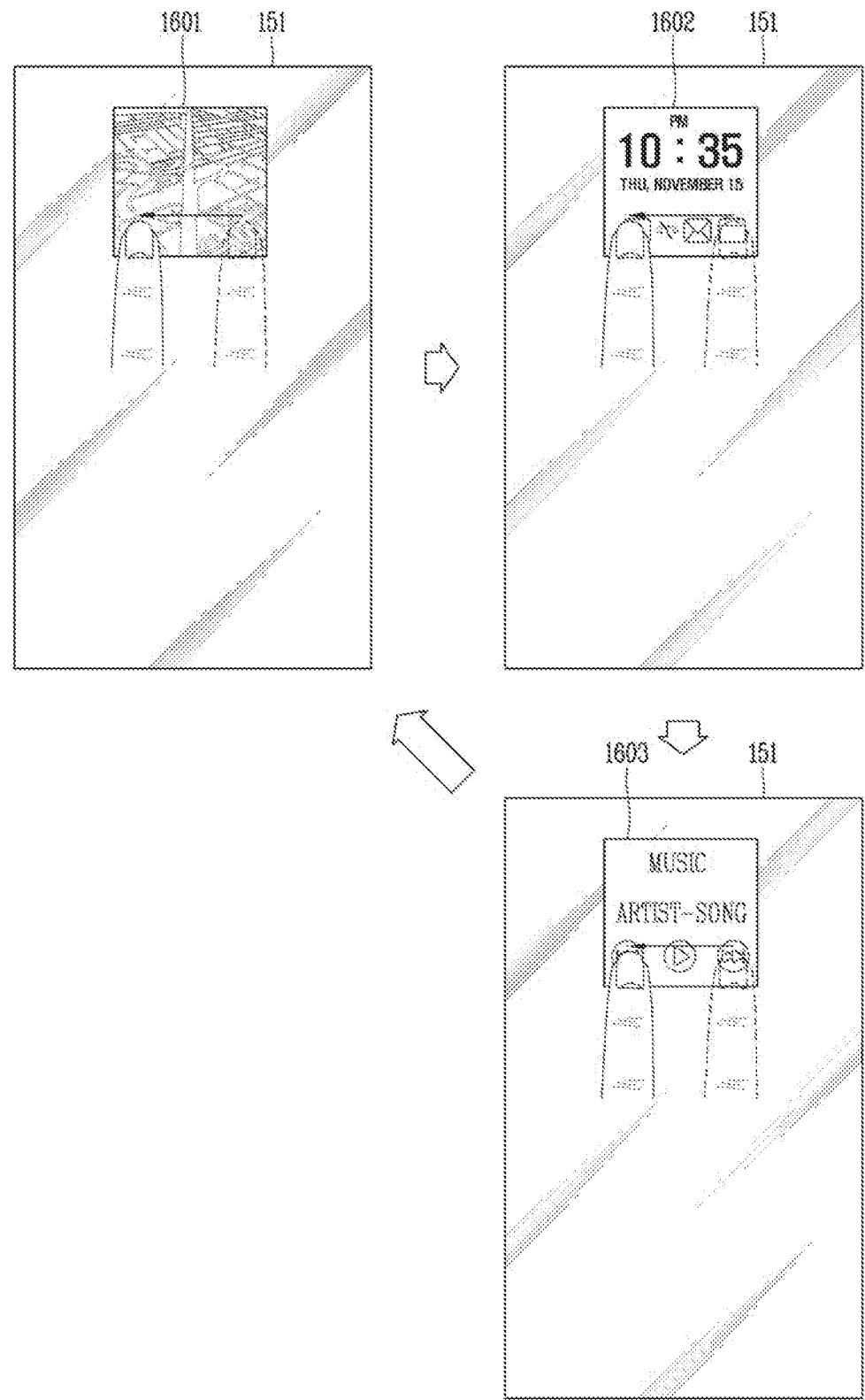

Next, FIGS. 16A and 16B illustrate an example of a method of switching to the next task with maintaining the inactive state of the display unit 151 during an execution of first and second task states.

To this end, when a drag touch input of a preset direction is applied to the display unit 151 while one of the first and second task states is executed in the inactive state of the display unit 151, the controller 180 may switch a third screen, which corresponds to the currently-executed task state, to predetermined information or a fourth screen, based on the dragged direction. Here, the predetermined information is information which was originally displayed when the display unit 151 was switched from the active state to the inactive state, and for example, may include time, weather, date, received events, schedule information, and the like.

For example, in FIG. 16A, when a drag touch input is applied in a horizontal direction while an execution screen 1601 of a navigation is displayed in one area of the inactive display unit 151, the execution screen 1601 of the navigation disappears like a page is turned over along the dragged direction, and an initial screen 1602 including time information appears in the corresponding area. In this state, when the drag touch input is continuously applied, the initial screen 1602 disappears and another image, for example, a sound reproduction screen 1603, may be displayed in the corresponding area. If there is no screen to be output according to the drag touch input, the screen returns to the initial execution screen 1601 of the navigation.

As another example, when a drag touch input is applied in a horizontal direction to the initial screen 1602 output to one area of the display unit 151 in the inactive state, the initial screen 1602 may be switched to an execution screen of a previous task, for example, a calendar screen 1602 while the display unit 151 is maintained in the inactive state. Thereafter, when the calendar screen is once output to the active display unit 151 as the touch input exceeding the reference pressure is applied to the calendar screen 1602 and then released (1610), the calendar screen 1602, which has been previously operated, may not be output any more in the display unit 151 switched to the inactive state.

The foregoing description has been given by limiting the information output in the inactive state of the display unit 151 to predetermined information or a task executed by the user's operation. Hereinafter, examples of a method of performing various operations or tasks desired by the user in the inactive state of the display unit 151 without limitation will be described.

To this end, it is assumed that information displayed in the inactive state of the display unit 151 is not an ongoing event such as a navigation execution screen or a video reproduction screen. For this, as illustrated in FIG. 17A, when the navigation execution screen 1701 is displayed while the display unit 151 is in the inactive state, the navigation execution screen 1701 may be switched to an initial screen 1702 or the like, by applying a drag touch input to the display unit 151 in a horizontal direction.

In the state where information, for example, the initial screen 1702, other than an ongoing event, is displayed on the display unit 151 in the inactive state, when a touch input exceeding the reference pressure is applied to the corresponding area 1702, the controller 180 may control the screen to display a predetermined hole area around a touch point to which the touch input has been applied.

Figure 17A:
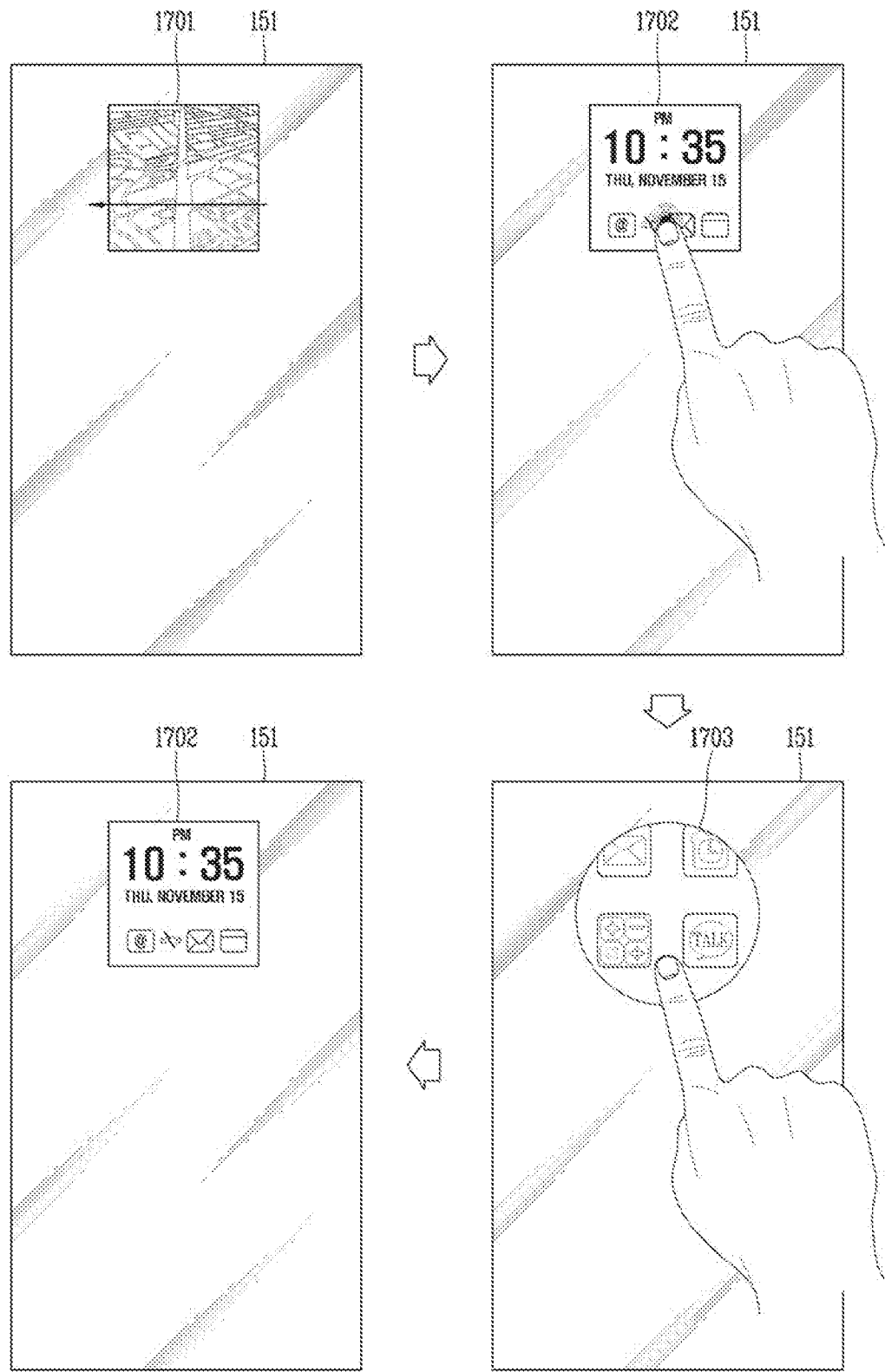

Here, although the hole area is shown as a circular shape as illustrated in FIG. 17A, it is not limited to the illustrated shape and size, and various modifications are possible.

Also, an image that might be output if the display unit 151 was switched to the active state is displayed in the hole area. For example, information that was output just before a home screen, a lock screen or the display unit 151 is switched to the inactive state may be displayed through the hole area. This provides the same effect as peeping through a small gap.

At this time, the controller 180 may adjust the size of the hole area according to a touch degree of a touch input. For example, the hole area becomes larger when a touch degree of the touch input applied to the initial screen 1702 is stronger. In addition, the size of the hole area may be adjusted by varying the touch degree of the applied touch input even after the hole area appears on the display unit 151 in the inactive state. Similarly, an amount of information displayed in the hole area may be determined based on the size of the hole area.

As illustrated in FIG. 17A, it can be seen that a part of a home screen is displayed in the hole area 1703 which appears based on the touch degree of the touch input. At this time, positions of icons of the home screen shown through the hole area 1703 correspond to original positions of the icons of the home screen.

On the other hand, when the touch input applied to the hole area 1703 is released or an input is not detected within a reference time after the release of the touch input, the controller 180 may control the screen such that the hole area disappears from the display unit 151 and the originally-displayed initial screen 1702 appears.

Figure 17B:
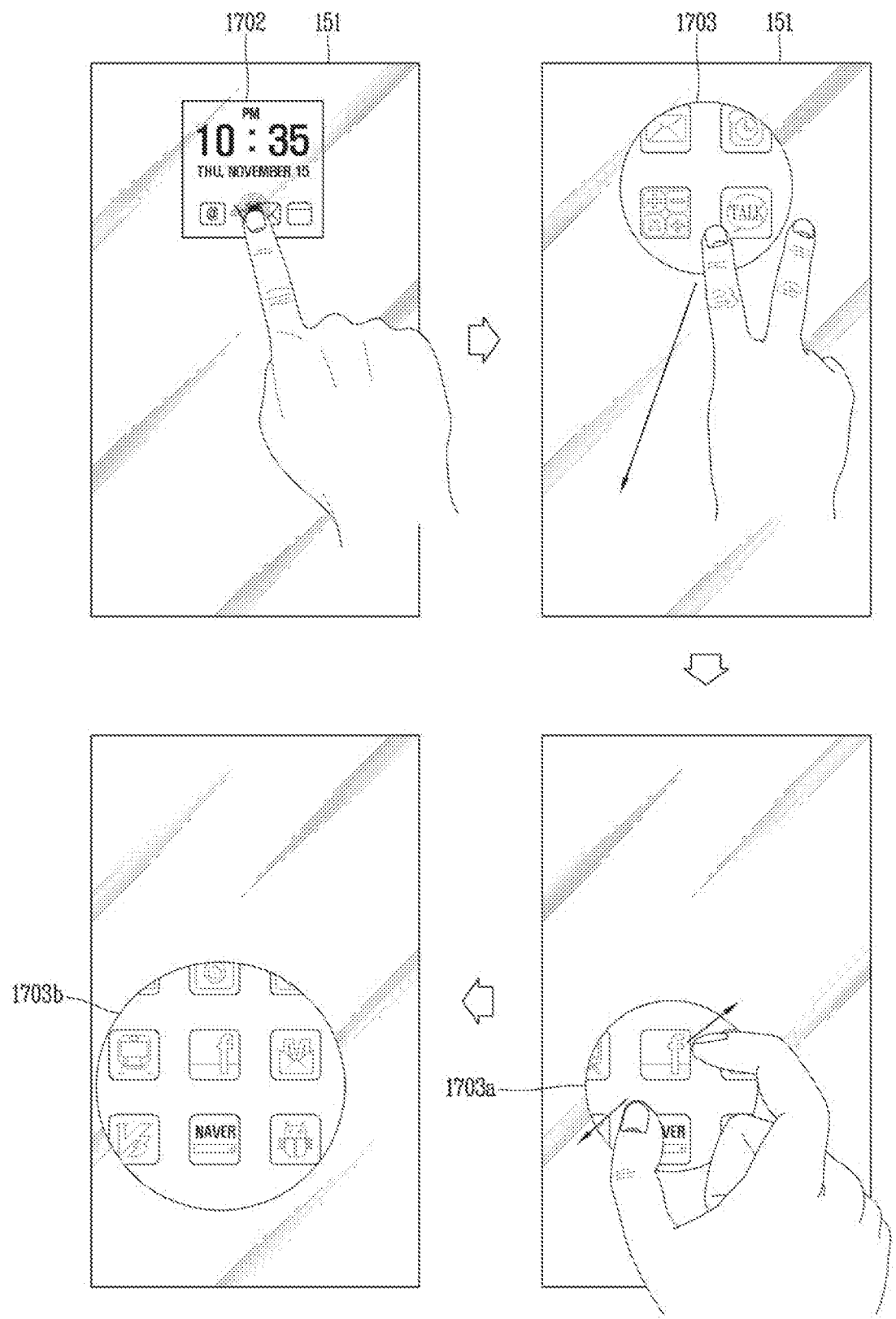

Hereinafter, FIG. 17B illustrates an example of adjusting the size and position of the hole area. As illustrated in FIG. 17B, when a predetermined touch input, for example, a two-finger drag touch input, is applied to the hole area 1703 in the inactive state of the display unit 151, the controller 180 may move the hole area 1703 along a dragged path. In addition, when a two-finger pinch-in/pinch-out touch input is applied to the hole area 1703*b*, the controller 180 may adjust the size of the hole area 1703*b* by zooming in/out the hole area 1703*b*.

Figure 17C:
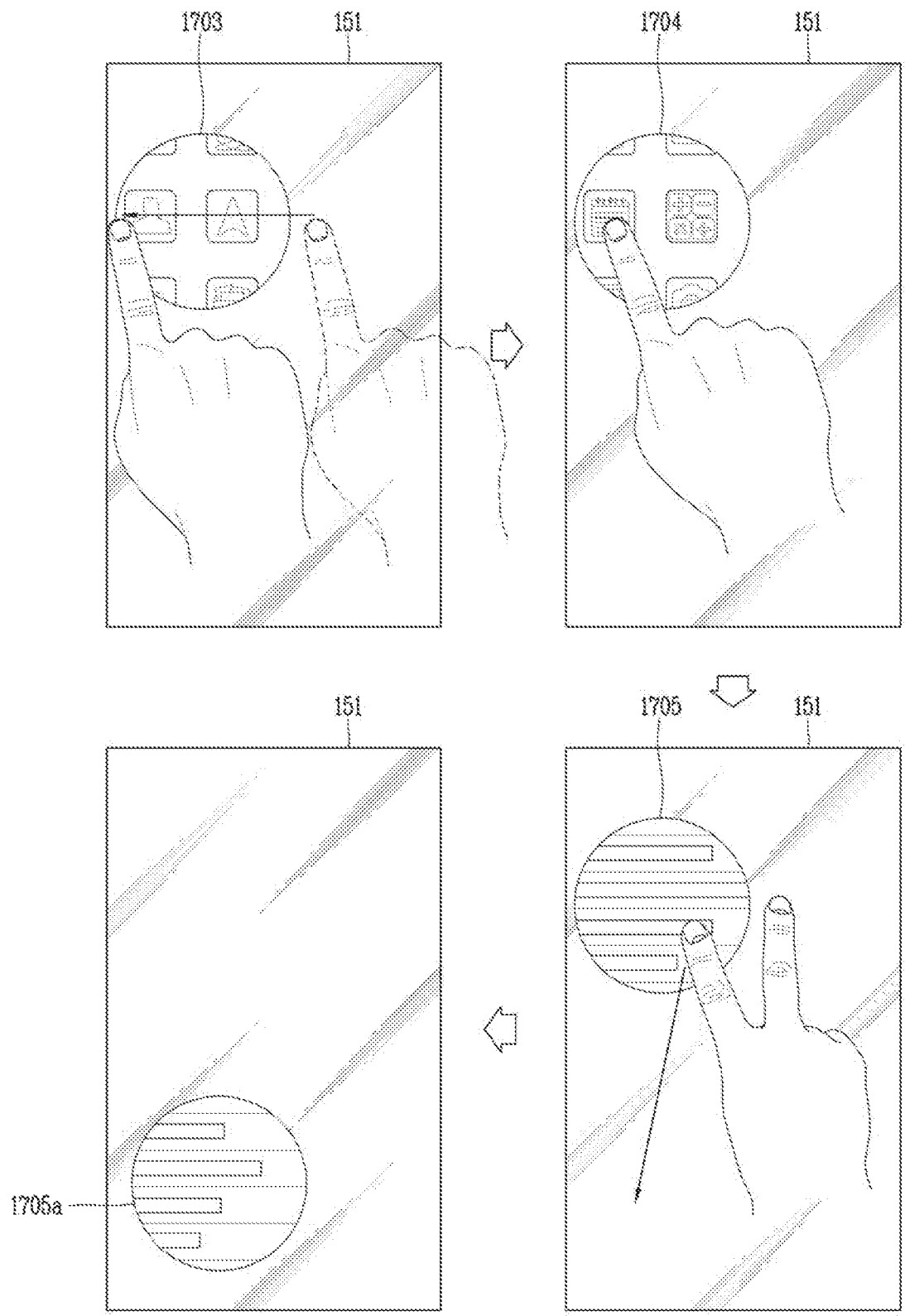

Next, FIG. 17C illustrates an example of controlling information viewed through the hole area 1703. For example, information displayed in the hole area 1703 may be scrolled before the hole area disappears by consecutively applying a drag touch input to a part of the home screen viewed through the hole area 1703 in a left-to-right/up-to-down direction within a reference time. Accordingly, when desired information is displayed in the hole area (1704), a control command for the desired information can be input using the touch input. For example, a specific application can be executed by touching an icon of the application on a part of the hole screen viewed through the hole area. Accordingly, an execution screen of the application may be displayed in the hole area (1705). Also, it is possible to fast enter a specific step as the touch input that exceeds the reference pressure is applied to the information displayed in the hole area 1704.

In this state, the user may move the position of the hole area using a two-finger drag touch input (1705*a*), and search for desired information without turning on an entire screen. This may result in obtaining not only a reduction of battery consumption but also protection of a private life by showing only a part of necessary information.

Figure 17D:
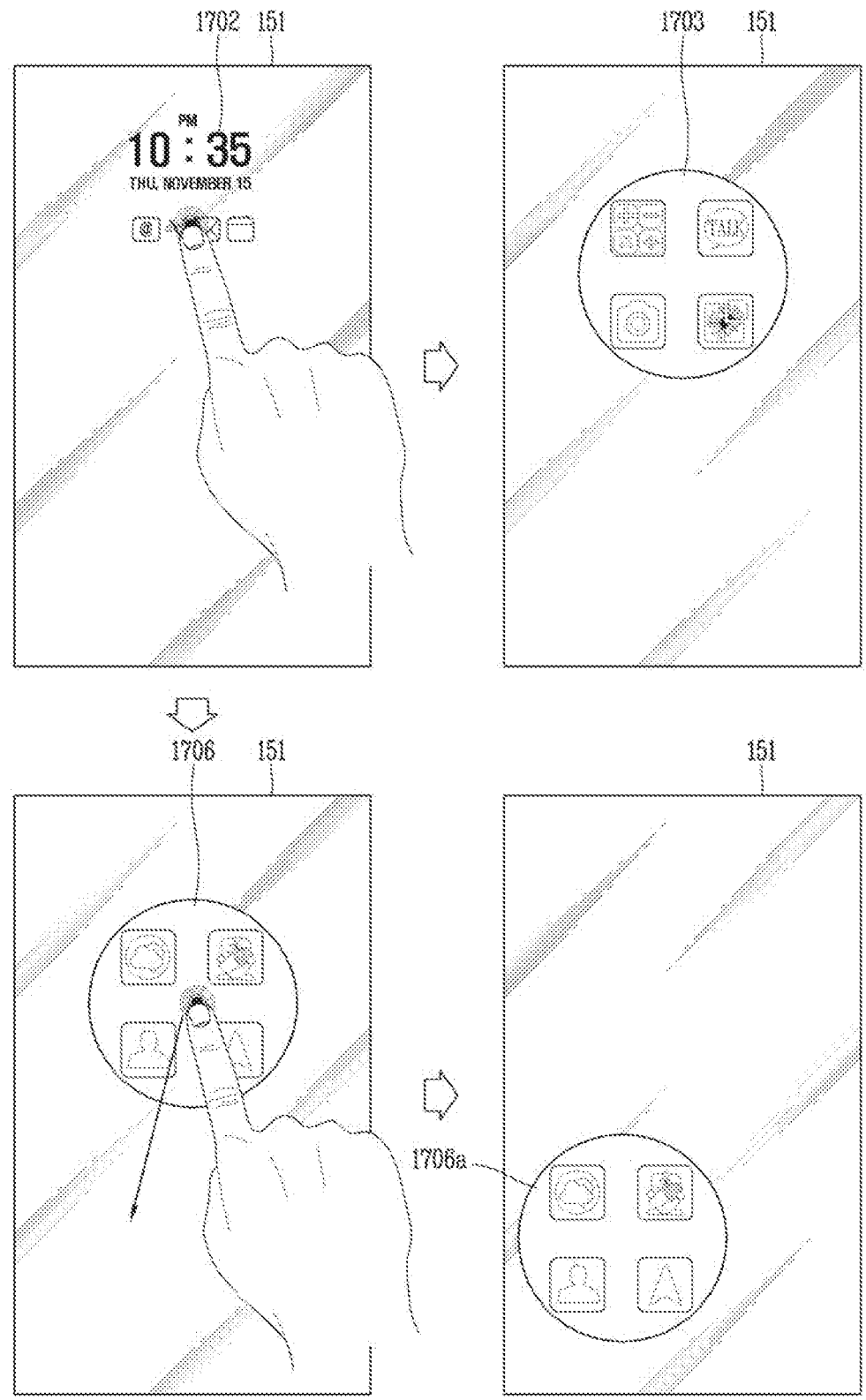

As another example, as illustrated in FIG. 17D, different information is displayed in the hole area according to whether or not the display unit 151 is locked.

First, if the display unit 151 is not locked, a part of the home screen is displayed in the hole area (1703). On the other hand, if locked, only icons of unlocked applications, i.e., non-secure icons, are viewed in the hole area (1706). At this time, even if the hole area moves along a drag-touch input (1706*a*), only the same non-secure icons as before appear in the hole area. That is, non-secure icons move together along the hole area.

When a touch degree of a pinch-out touch input applied to the hole area exceeds a reference value, that is, when the pinch-out touch input is applied while the size of the hole area is the maximum, the controller 180 may activate the display unit 151 and output an entire screen which was viewed through the hole area on the entire display unit 151.

Hereinafter, description will be given of examples of performing different operations according to whether or not there is a task state being executed when an event occurs in the inactive state of the display unit 151.

Figure 18A:
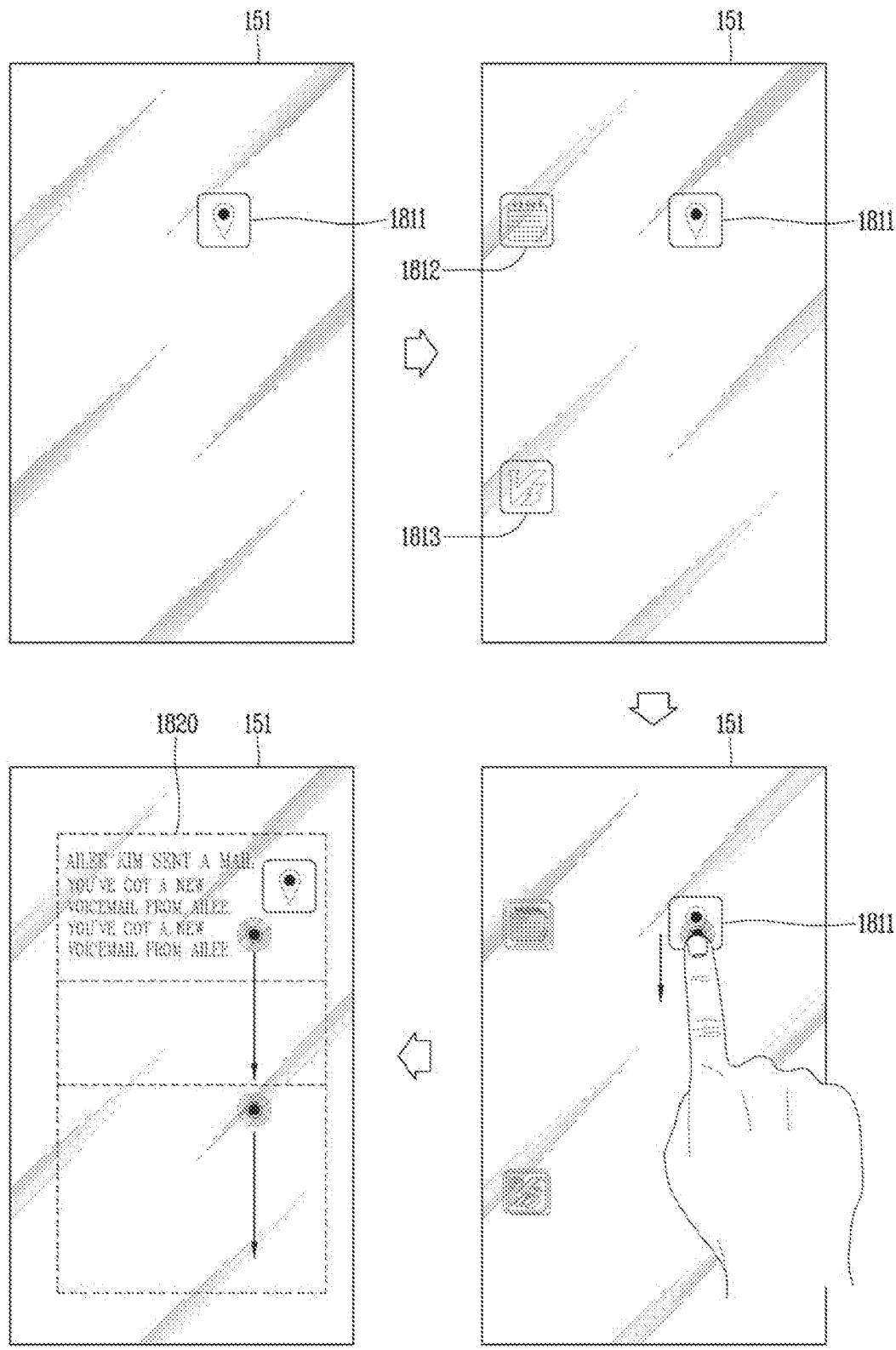

First, as illustrated in FIG. 18A, when an event occurs in at least one application while the display unit 151 is in the inactive state, a first icon 1811 of the application in which the event has occurred may be displayed on the display unit 151 in the inactive state (1811). The first icon 1811 may continue to be displayed until the user's confirmation is obtained or disappear after a predetermined time. Further, as an event occurs in another application, a second icon 1812 and a third icon 1813 may be further displayed on the display unit 151 in the inactive state.

At this time, output positions of the first icon 1811, the second icon 1812, and the third icon 1813 may correspond to positions of the corresponding icons on the home screen. Alternatively, in another example, events may be displayed in a manner of be sequentially filled from an arbitrary point of the display unit 151 according to an occurred order, or displayed in a layered form by setting a lately-occurred event as a representative image.

When a touch input exceeding the reference pressure is applied to a specific icon to be confirmed, for example, the first icon 1811 and then dragged in one direction, the other icons 1812, 1813 may temporarily become transparent and contents of the event corresponding to the icon 1811 may be displayed on the display unit 151 in proportion to a dragged degree. If the event is confirmed in the inactive state of the display unit 151, only the other icons 1812 and 1813 that have not been confirmed may be displayed on the display unit 151.

Figure 18B:
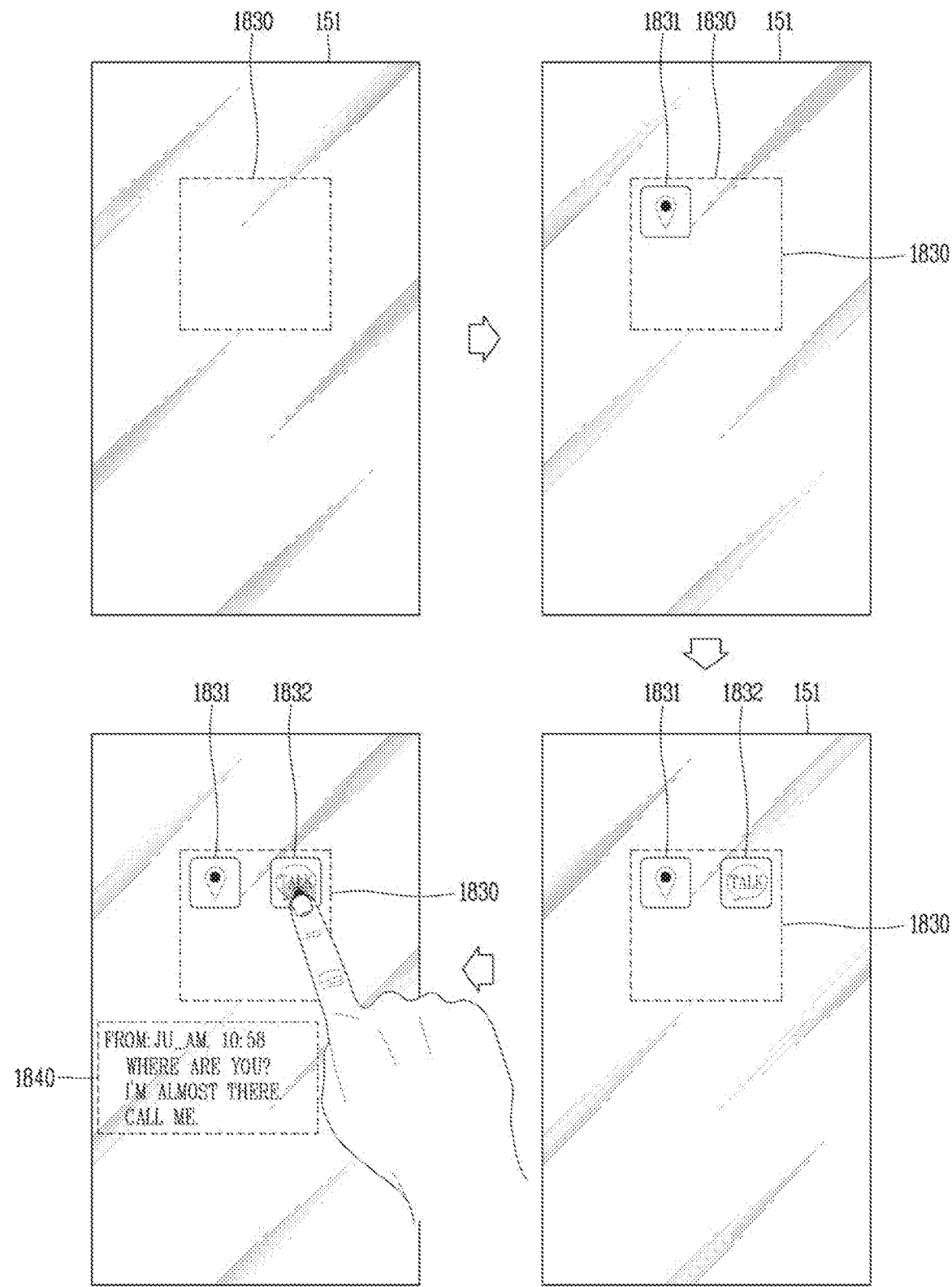

As another example, as illustrated in FIG. 18B, icons 1831 and 1832 of applications in which events occur may be displayed only in a predetermined area 1830 of the display unit 151. In this case, while a touch input is applied to the icon 1832 of the event to be confirmed, the contents of the event may be displayed in an area outside the predetermined area 1830 (1840).

Figure 18C:
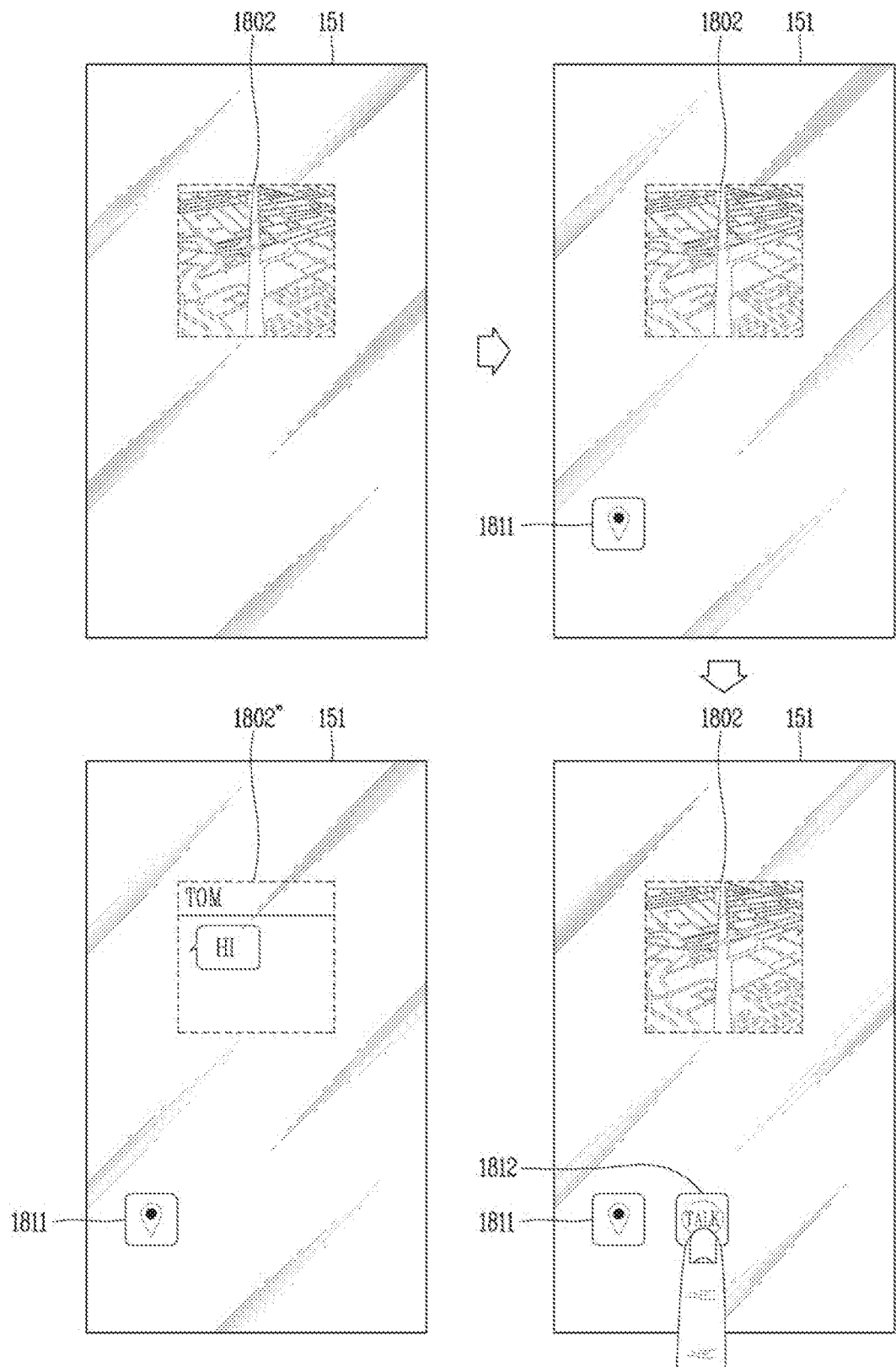

Next, FIG. 18C illustrates a process performed when an event occurs while a selected specific task state is executed in the display unit 151 in the inactive state. For example, when a specific event is received while a navigation execution screen 1802 is displayed in a predetermined area, icons may be displayed in an area out of the execution screen 1802 (1811, 1812). Meanwhile, if a touch input exceeding the reference pressure is applied to the icon 1812 for which an event is to be confirmed, the contents of the corresponding event may be displayed in the area where the navigation execution screen 1802 is displayed and then disappear (1802"). At this time, the controller 180 may control a display degree of information related to the event differently based on the touch degree of the touch input applied to the icon 1812.

As described above, if the user wishes to check contents of an event first rather than a task being executed, the contents of the event may be displayed for a while and then the navigation execution screen 1802 may be displayed again. The icon of the confirmed event disappears from the display unit 151.

Figure 19A:
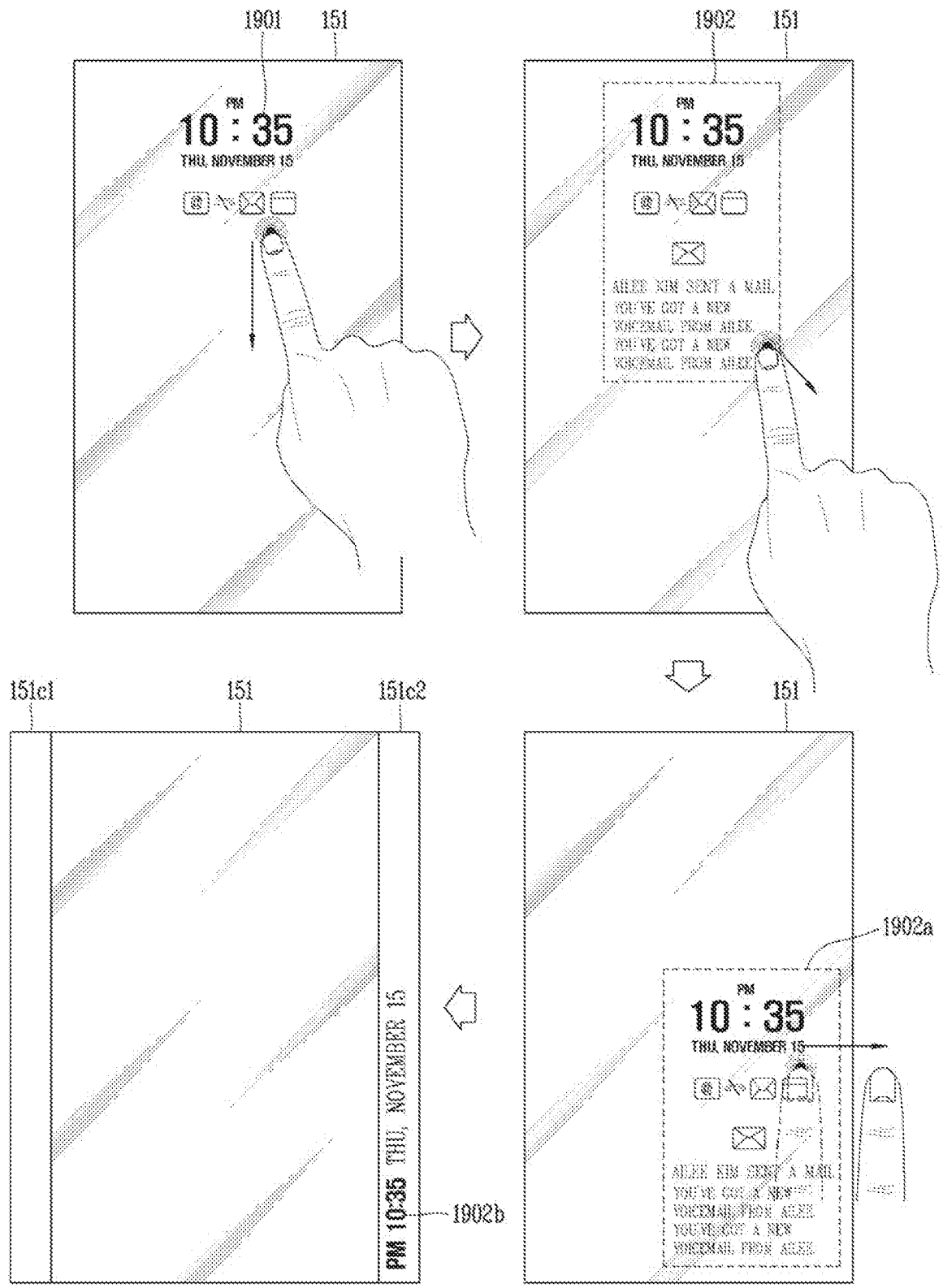

As another example of the process performed at the time of the event occurrence, as illustrated in FIG. 19A, contents of an event may be confirmed by applying a drag touch input to an icon displayed on an initial screen 1901. At this time, the controller 180 may determine a size of an area where the contents of the event are displayed or a quantity of event contents according to a dragged degree of the touch input.

Next, the controller 180 may move the area where the event contents are displayed by using a drag touch input. At this time, as illustrated in FIG. 19A, when the display unit 151 of the mobile terminal 100 includes side displays 151c1 and 151c2, the controller 180 may display the event contents by moving the same to the side display 151c2 corresponding to a dragged direction of the touch input. Or, as illustrated in FIG. 19B, when the display unit 151 of the mobile terminal 100 includes an auxiliary display 151d disposed on an upper end, the controller 180 may move time information 1901 or an icon 1903 notifying an event occurrence to the auxiliary display 151d and display the same on the auxiliary display 151d (1911, 1912).

Hereinafter, FIGS. 20A, 20B, 21A, 21B, 22A and 22B illustrate examples of a method of setting or changing a type and position of information displayed while the display unit is in the inactive state, using a touch input.

Figure 20:
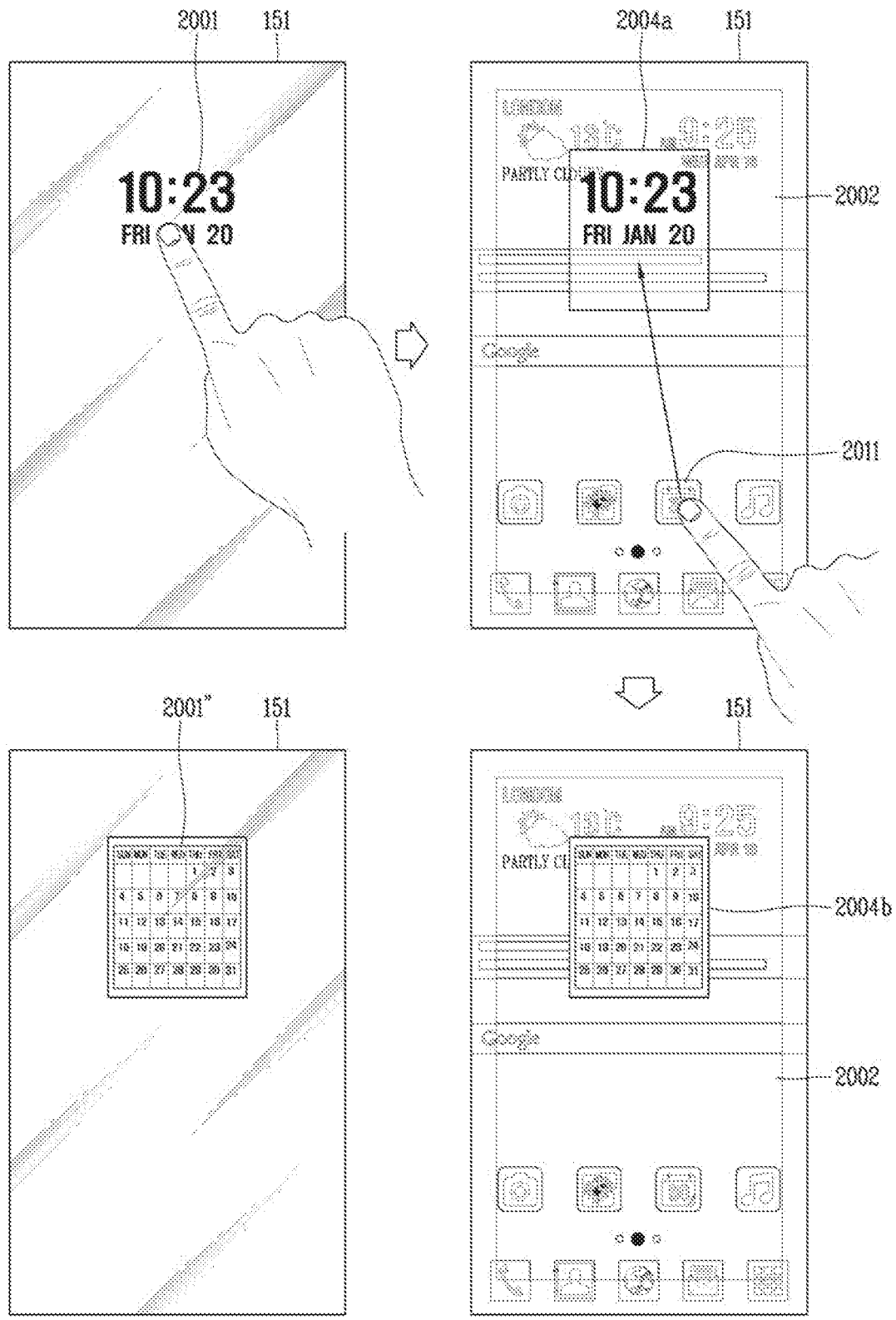

Referring to FIG. 20, in a state where an initial screen 2001 including predetermined information (e.g., time or weather information) is displayed in the display unit 151 in the inactive state, when a touch input exceeding the reference pressure is applied to the initial screen 2001, an initial screen setting mode may be activated.

Upon entering the initial screen setting mode, the controller 151 displays an area 2004a of the initial screen and displays a page 2002 including icons (and/or widgets) of a plurality of applications in a lower layer at predetermined transparency. When an icon 2011 of a specific application is selected in the displayed page 2002 and the selected icon 2011 is dragged and dropped into the area 2004a of the initial screen, the controller 180 may control a screen such that an execution screen (or a specific page) of the application is displayed in the area 2004a of the initial screen (2004b). When a predetermined time elapses after the drag and drop, an execution screen (or a specific page) of the application is set as an initial screen and the initial screen setting mode is ended. Afterwards, as illustrated in FIG. 20, a calendar screen 2001" set in the initial screen setting mode is displayed as an initial screen on the display unit 151 in the inactive state.

In the meantime, the foregoing embodiments have merely illustrated that predetermined information or a specific task state is displayed in a predetermined area in the display unit 151 in the inactive state. However, initial values of position and size of the area in which the predetermined information or the specific task state is displayed may be changed by a user's operation.

Figure 21A:

In addition, as illustrated in FIG. 21A, a plurality of virtual areas may be partitioned on the display unit 151 in the inactive state, such that an output area of information can be differently set according to a type of an application or content. For example, each area may be set such that 'music, received event, and memo' are displayed on an upper part of the display unit 151 in the inactive state, 'weather, time and date information, and schedule' are displayed on a middle part, and 'health and tomorrow schedule' are displayed in a lower part. Afterwards, a touch input exceeding the reference pressure may be applied to an area for which setting is to be changed, thereby changing setting information related to the area.

Alternatively, as illustrated in FIG. 21B, the user may enter the setting mode to differently adjust sizes of the virtual areas partitioned in the display unit 151 in the inactive state, or change a type and amount of information to be displayed in a desired view style in various ways. In addition, a notification bar which was output in the active state of the display unit 151 may be displayed on the display unit 151 in the inactive state, and detailed information corresponding to the touch input that exceeds the reference pressure may also be displayed.

Figure 22A:
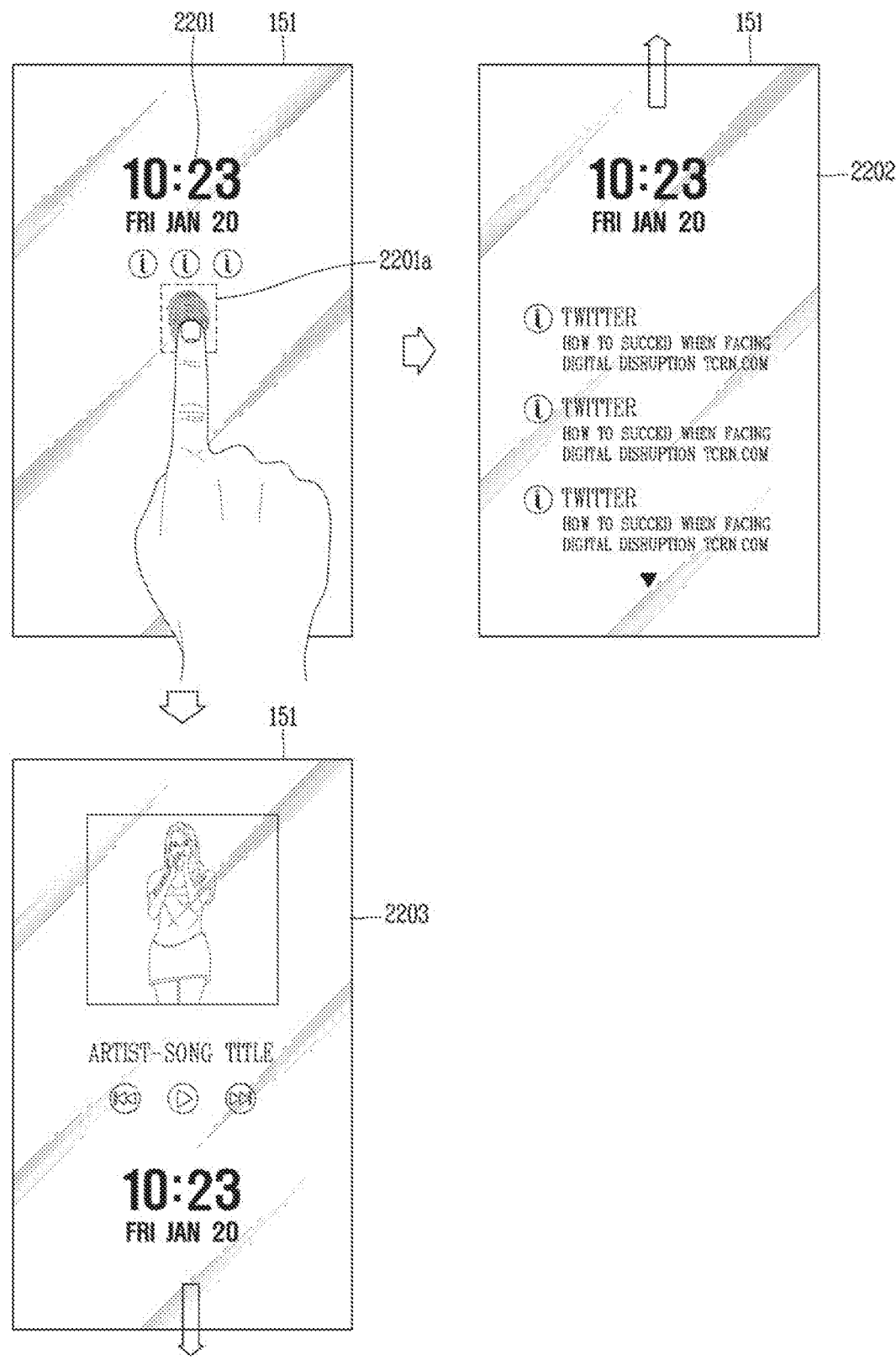
Figure 22B:
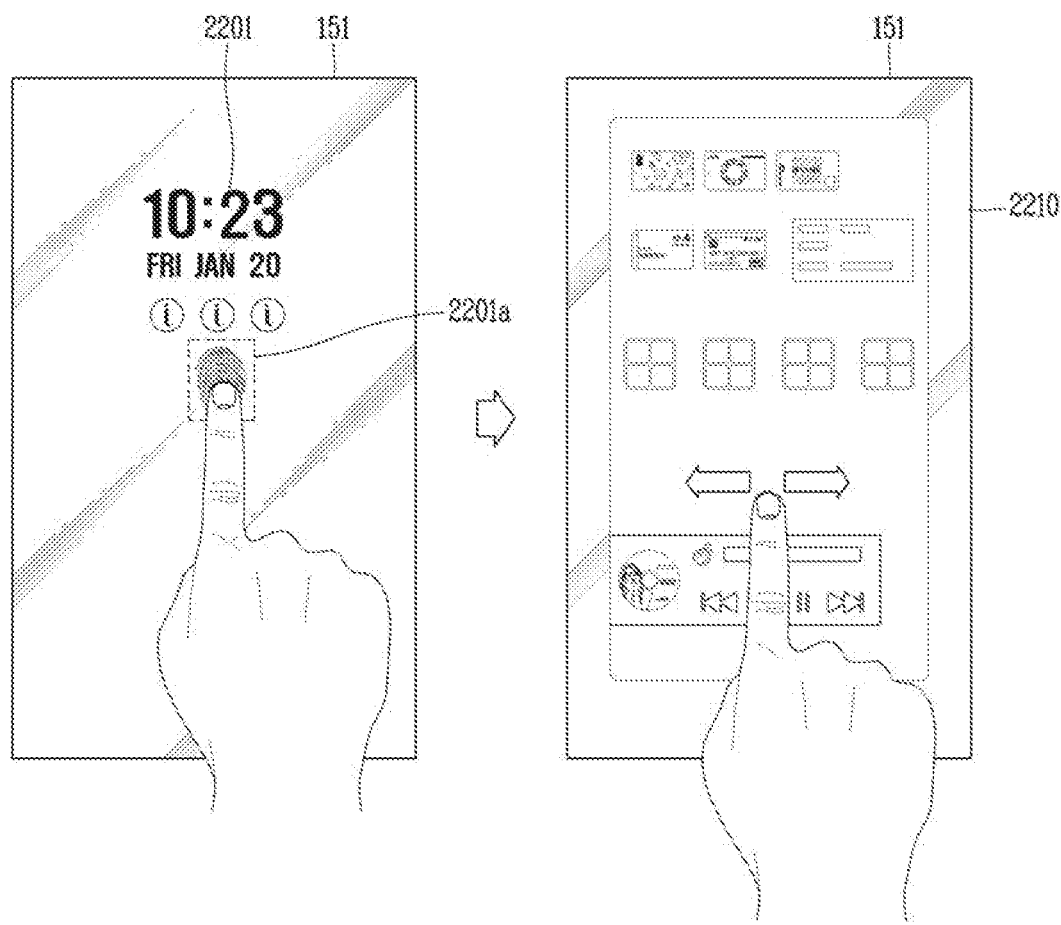

Next, FIGS. 22A and 22B illustrates that a finger scan area is included in the display unit 151 in the inactive state. To this end, when the display unit 151 is switched to the inactive state, predetermined information is displayed and simultaneously a finger scan function is activated.

FIGS. 22A and 22B illustrate that the finger scan area is included in a bottom of an initial screen. However, the present invention is not limited to this. Another position (including all of another position of the display unit 151 or another position on the mobile terminal 100) or the finger scan area on the initial screen may also be activated. Alternatively, when a touch input is first applied to the display unit 151 in the inactive state, the finger scan function may be activated at that time and a guide object 2201a for guiding the user to scan a finger may be displayed.

When a flicking touch input is applied in a first direction (e.g., upward) after matching an input finger with a preset input, as illustrated in FIG. 22A, personal information that has been unsecured is displayed on the display unit 151 in the inactive state (2202). On the other hand, if a flicking touch input is applied in a second direction (e.g., downward), a specific content specified by the user, for example, a specific sound source reproduction may be executed on the display unit 151 in the inactive state (2203).

When a touch input rubbing the display unit 151 in a left and right direction after matching an input finger with a preset input, an unlocked home screen may be displayed on the display unit 151 in the inactive state while the touch input is maintained. When a tab is applied in this state, a screen may be turned on and the unlocked home screen may be maintained. On the other hand, when the touch input is released, the unlocked home screen may disappear.

As described above, according to a mobile terminal and a control method thereof according to an embodiment of the present invention, a plurality of applications can freely be switched (shifted, moved) to one another according to a touch degree of a touch input applied to a display, and a desired specific task state in another application can immediately be entered through a single touch input. In addition, a background screen of a home screen can be set or selected information can automatically be input in the specific task state of the another application, through a single touch input. Furthermore, a specific task state itself or a task result can always be displayed on a display in an inactive state, which may result in minimizing battery consumption and continuously confirming desired information.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A mobile terminal, comprising:
a touch screen formed to be switchable between an active state and an inactive state wherein the touch screen is configured to display restricted image information by driving in a low power mode when switched to the inactive state, and wherein the restricted image information is:
image information displayed only on a partial area of the touch screen;
image information displayed at a brightness level that is less than a reference level; or
image information displayed in black and white; and
a controller configured to:
execute a first application;
execute a first task state among task states executable in the first application according to the execution of the first application;
cause the touch screen to display an execution screen of the first task state;
execute a second task state associated with the first task state and cause the touch screen to display an execution screen of the second task state, based on a first touch input received on the touch screen while the first application is executed, wherein the second task state is determined differently according to an intensity of pressure caused by the first touch input;
switch the touch screen from the active state to the inactive state when a second touch input exceeding a reference pressure is received while the execution screen of the second task state is displayed on the touch screen, wherein the first task state and the second task state continue to be executed while the touch screen is in the inactive state;
cause the touch screen in the inactive state to display the execution screen of the first task state or the execution screen of the second task state as the restricted image information; and
change at least one of a position or a size of the restricted image information in response to a touch input received on the restricted image information displayed on the touch screen in the inactive state.

2. The terminal of claim 1, wherein the restricted image information is maintained even after the second touch input is released.

3. The terminal of claim 1, wherein the controller is further configured to cause the touch screen to display guide information to guide an input for executing the second task state in the inactive state.

4. The terminal of claim 1, wherein the active state is switched to the inactive state at a time point when the second touch input is released.

5. The terminal of claim 1, wherein the second task state is determined according to the intensity of pressure of the first touch input and information output at a touch point of the first touch input.

6. The terminal of claim 5, wherein the controller executes a second application associated with the information output at the touch point of the first touch input, and executes the second task state corresponding to a setting mode of the second application associated with the first task state.

7. The terminal of claim 6, wherein the controller is further configured to set at least setting information to be displayed in the inactive state when the setting information is input in the second task state in response to a touch input exceeding the reference pressure in the setting mode.

8. The terminal of claim 1, wherein the controller pops up a sub menu associated with the second task state on the touch screen when the second touch input is dragged in a preset direction, and
selectively executes a function associated with the popped-up sub menu according to a dragged degree of the second touch input.

9. The terminal of claim 1, wherein the controller is further configured to:
select at least one of displayed objects based on a touch degree of a touch input applied to a first screen corresponding to the first task state; and
execute the second task state in which the selected at least one object is input in an execution screen of a second application associated with the first task state when a touch input exceeding the reference pressure is subsequently applied to the selected at least one object.

10. The terminal of claim 9, wherein the controller switches the active state to the inactive state and displays the selected at least one object together with the predetermined information when the touch input exceeding the reference pressure is consecutively applied to the touch screen in a state where the execution screen of the second application is displayed.

11. The terminal of claim 1, wherein the controller is further configured to switch the inactive state to the active state and cause the touch screen to display information output on the screen area on an entire area of the touch screen when a touch input exceeding the reference pressure is applied to the restricted image information.

12. The terminal of claim 1, wherein the controller is further configured to:
 when a drag touch input is applied to the touch screen in a preset direction while one of the first and second task states is executed in the inactive state, switch the restricted image information, based on the dragged direction.

13. The terminal of claim 1, wherein in response to a touch input exceeding the reference pressure and received on the restricted image information displayed on the touch screen in the inactive state, the controller is further configured to cause the touch screen to:
 display a hole area around a touch point corresponding to the touch input received on the restricted image information and exceeding the reference pressure; and
 display an image which was displayed in the active state of the touch screen in the hole area.

14. The terminal of claim 1, wherein the controller, when an event occurs in at least one application while one of the first and second task states is executed in the inactive state, displays a notification icon related to the event in a predetermined area in the inactive state and controls a display degree of information related to the event based on a touch degree of a touch input applied to the notification icon.

15. The terminal of claim 1, wherein the second touch input is received continuously following the first touch input.

16. The terminal of claim 15, wherein the controller is further configured to cause the touch screen to display the predetermined information after a predetermined time elapses when the touch screen is switched to the inactive state.

17. The terminal of claim 16, wherein no information is displayed on the touch screen until the predetermined time elapses when the touch screen is switched to the inactive state.

18. The terminal of claim 15, wherein the predetermined information comprises time information.

19. The terminal of claim 15, wherein the controller is further configured to cause the touch screen to display the predetermined information as the touch screen is switched to the inactive state such that switching to the inactive state and displaying the predetermined information occur simultaneously.

* * * * *